US012623346B2

(12) United States Patent
Chang et al.

(10) Patent No.: US 12,623,346 B2
(45) Date of Patent: May 12, 2026

(54) PROCESSING PATH PLANNING SIMULATION DEVICE AND METHOD

(71) Applicant: DELTA ELECTRONICS, INC., Taoyuan City (TW)

(72) Inventors: Chin-Wei Chang, Taoyuan City (TW); Sih-Han Fang, Taoyuan City (TW); Shao-Huang Lu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 265 days.

(21) Appl. No.: 18/366,688

(22) Filed: Aug. 8, 2023

(65) Prior Publication Data

US 2024/0316774 A1 Sep. 26, 2024

(30) Foreign Application Priority Data

Mar. 21, 2023 (CN) .......................... 202310278061.3

(51) Int. Cl.
*B25J 9/16* (2006.01)

(52) U.S. Cl.
CPC ........... *B25J 9/1666* (2013.01); *B25J 9/1671* (2013.01)

(58) Field of Classification Search
CPC ...... B25J 9/1666; B25J 9/1671; B25J 9/1664; B25J 9/16; B25J 19/0095; B25J 9/1661;
(Continued)

(56) References Cited

U.S. PATENT DOCUMENTS 7,130,716 B2 10/2006 Rogers et al.
2011/0153080 A1* 6/2011 Shapiro .................. B25J 9/1666
700/255
(Continued)

FOREIGN PATENT DOCUMENTS

CN 104090492 A 10/2014
CN 107160402 A * 9/2017 ............ B25J 9/1666
(Continued)

OTHER PUBLICATIONS

Blum, "Ant colony optimization: Introduction and recent trends", Physics of Life Reviews, vol. 2, Issue 4, 2005, pp. 353-373, ISSN 1571-0645, https://doi.org/10.1016/j.plrev.2005.10.001. (Year: 2005).*
(Continued)

*Primary Examiner* — Adam R Mott
*Assistant Examiner* — James Miller Watts, III
(74) *Attorney, Agent, or Firm* — CKC & Partners Co., LLC

(57) ABSTRACT

A processing path planning simulation device is provided, which includes a memory and a processor. The processor performs following operations: according to an obstacle model, multiple processing point positions, a mechanical arm model, a processing tool model, a model position relative relationship and a production strategy parameter, performing collision test simulation to generate multiple candidate poses of the mechanical arm model; performing path optimization algorithms on the multiple candidate poses to generate a pose sequence; performing an ant colony algorithm based on the pose sequence and the obstacle model to generate an optimal processing path; and based on the optimal processing path, simulating that an end point of the processing tool model on the mechanical arm model performs a virtual processing operation on the multiple processing point positions sequentially according to the multiple optimal nodes.

18 Claims, 17 Drawing Sheets

(58) Field of Classification Search

CPC ... B25J 9/1676; B25J 9/1656; G01C 21/3446;
G01C 21/20; G05D 1/0214

See application file for complete search history.

(56) References Cited

U.S. PATENT DOCUMENTS

| | | |
|---|---|---|
| 2011/0224815 A1 | 9/2011 | Sonner et al. |
| 2018/0036882 A1 | 2/2018 | Kimura |
| 2022/0402131 A1 | 12/2022 | Sivanath et al. |
| 2024/0253227 A1* | 8/2024 | Lee ........................ B25J 9/1666 |

FOREIGN PATENT DOCUMENTS

| | | |
|---|---|---|
| CN | 107511825 A | 12/2017 |
| CN | 114859920 A | 8/2022 |
| TW | I650626 B | 2/2019 |
| TW | I701122 B | 8/2020 |
| TW | I723309 B | 4/2021 |
| TW | I725630 B | 4/2021 |

OTHER PUBLICATIONS

Translation of CN 107160402 A (Year: 2017).*

M. Dorigo, V. Maniezzo and A. Colorni, "Ant system: optimization by a colony of cooperating agents," in IEEE Transactions on Systems, Man, and Cybernetics, Part B (Cybernetics), vol. 26, No. 1, pp. 29-41, Feb. 1996, doi: 10.1109/3477.484436. (Year: 1996).*

Liu, S. and Liu, P. et al., "A Review of Motion Planning Algorithms for Robotic Arm Systems", International Conference on Robot Intelligence Technology and Applications, Dec. 11-13, 2020.

Jünger, Michael et al., "The traveling salesman problem", Handbooks in operations research and management science, Feb. 1994, 7:225-330.

Ravankar A. et al., "Path Smoothing Techniques in Robot Navigation: State-of-the-Art, Current and Future Challenges", Sensors, Sep. 19, 2018; 18(9):3170.

Cimurs, R. et al., "Time-optimized 3D Path Smoothing with Kinematic Constraints", International Journal of Control, Automation and System, 2020.

* cited by examiner

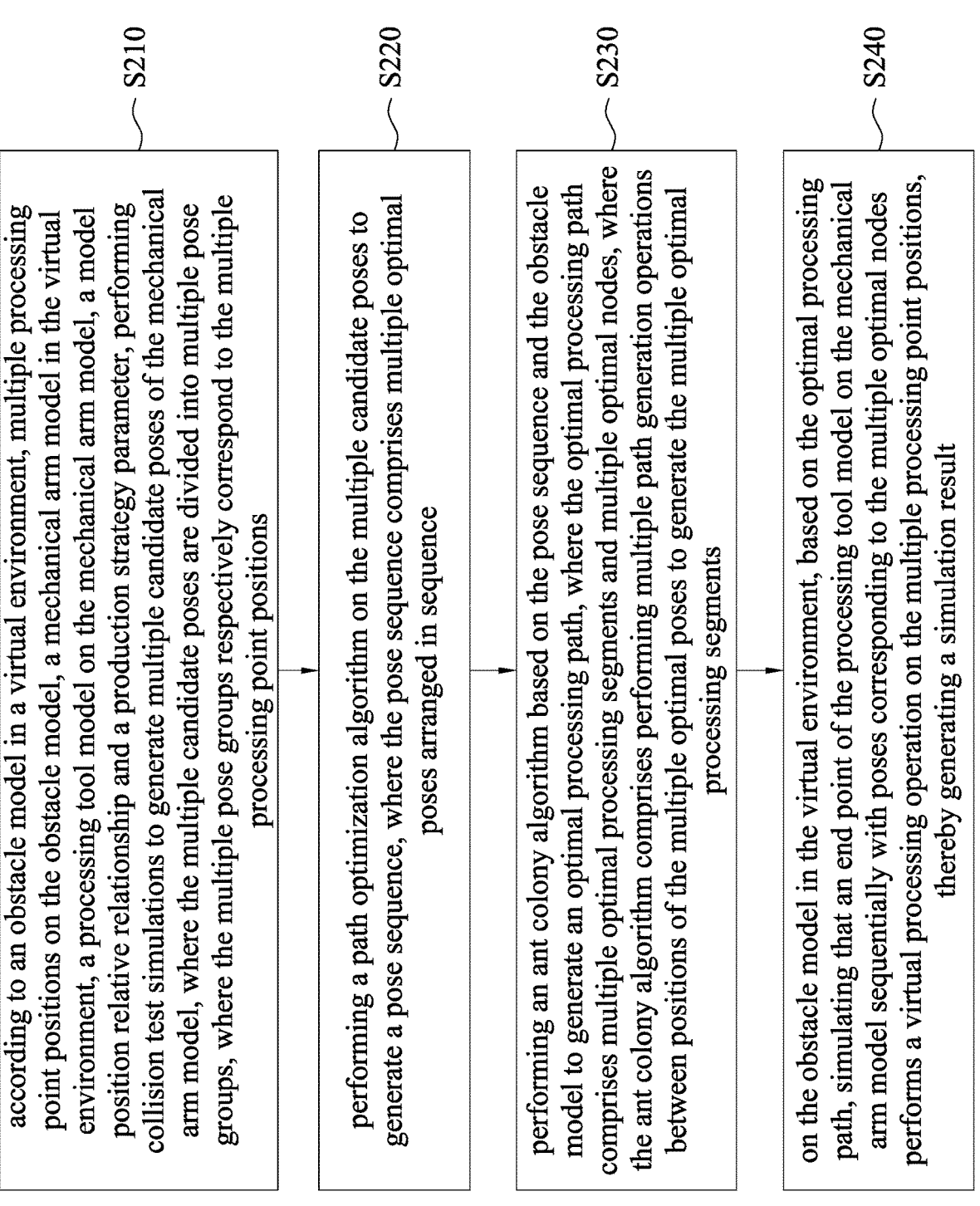

according to an obstacle model in a virtual environment, multiple processing point positions on the obstacle model, a mechanical arm model in the virtual environment, a processing tool model on the mechanical arm model, a model position relative relationship and a production strategy parameter, performing collision test simulations to generate multiple candidate poses of the mechanical arm model, where the multiple candidate poses are divided into multiple pose groups, where the multiple pose groups respectively correspond to the multiple processing point positions ⟋ S210 performing a path optimization algorithm on the multiple candidate poses to generate a pose sequence, where the pose sequence comprises multiple optimal poses arranged in sequence ⟋ S220 performing an ant colony algorithm based on the pose sequence and the obstacle model to generate an optimal processing path, where the optimal processing path comprises multiple optimal processing segments and multiple optimal nodes, where the ant colony algorithm comprises performing multiple path generation operations between positions of the multiple optimal poses to generate the multiple optimal processing segments ⟋ S230 on the obstacle model in the virtual environment, based on the optimal processing path, simulating that an end point of the processing tool model on the mechanical arm model sequentially with poses corresponding to the multiple optimal nodes performs a virtual processing operation on the multiple processing point positions, thereby generating a simulation result ⟋ S240

MAM

ST

PROCESSING PATH PLANNING SIMULATION DEVICE AND METHOD

CROSS-REFERENCE TO RELATED APPLICATION

This application claims priority to China Application Serial Number 202310278061.3, filed Mar. 21, 2023, which is herein incorporated by reference in its entirety.

BACKGROUND

Field of Disclosure

The present disclosure relates to a processing path planning simulation device and method.

Description of Related Art

In electronic manufacturing industry, mechanical arms are widely used for replacing traditional manpower processes due to their flexibility, e.g., processes of loading and unloading, screw locking, glue dispensing, components inserting and soldering, etc., and most of these processes rely on the mechanical arms to mount tools to perform processing tasks. Furthermore, traditional processing path planning needs to be taught and programmed by engineers on site, which will occupy actual machines thereby causing break time costs and time costs. In addition, results of processing path planning are highly dependent on past experience and knowledge. In typical practice, to avoid collisions, many auxiliary points are arranged in the path to avoid obstacles to ensure that the mechanical arm does not collide with other objects during performing the tasks. In addition, in processes of moving to another hand configuration (hereinafter referred to as changeover) of the mechanical arm, an arm pose may have a large change. Therefore, this often perform changeover on a place away the obstacles (e.g., after the glue dispensing processing of one time, the mechanical arm is raised by 3 to 50 cm to ensure that there is no collision). In this way, it can ensure that the mechanical arm can move smoothly when performing changeover, and avoid collisions to the greatest extent. However, such the path planning is often not an optimal processing path, and there is room for improvement.

SUMMARY

The disclosure provides a processing path planning simulation device, which comprises a memory and a processor. The memory is configured for storing a plurality of instructions. The processor is connected to the memory, and configured for accessing a plurality of instructions, and performing following operations: according to an obstacle model in a virtual environment, a plurality of processing point positions on the obstacle model, a mechanical arm model in the virtual environment, a processing tool model on the mechanical arm model, a model position relative relationship and a production strategy parameter, performing collision test simulations to generate a plurality of candidate poses of the mechanical arm model, wherein the plurality of candidate poses are divided into a plurality of pose groups, wherein the plurality of pose groups respectively correspond to the plurality of processing point positions; performing a path optimization algorithm on the plurality of candidate poses to generate a pose sequence, wherein the pose sequence comprises a plurality of optimal poses arranged in sequence; performing an ant colony algorithm based on the pose sequence and the obstacle model to generate an optimal processing path, wherein the optimal processing path comprises a plurality of optimal processing segments and a plurality of optimal nodes, wherein the ant colony algorithm comprises performing a plurality of path generation operations between positions of the plurality of optimal poses to generate the plurality of optimal processing segments; and on the obstacle model in the virtual environment, based on the optimal processing path, simulating that an end point of the processing tool model on the mechanical arm model sequentially with poses corresponding to the plurality of optimal nodes performs a virtual processing operation on the plurality of processing point positions, thereby generating a simulation result.

The disclosure further provides a processing path planning simulation method comprises: according to an obstacle model in a virtual environment, a plurality of processing point positions on the obstacle model, the mechanical arm model in the virtual environment, a processing tool model on the mechanical arm model, a model position relative relationship and a production strategy parameter, performing collision test simulations to generate a plurality of candidate poses of the mechanical arm model, wherein the plurality of candidate poses are divided into a plurality of pose groups, wherein the plurality of pose groups respectively correspond to the plurality of processing point positions; performing a path optimization algorithm on the plurality of candidate poses to generate a pose sequence, wherein the pose sequence comprises a plurality of optimal poses arranged in sequence; performing an ant colony algorithm based on the pose sequence and the obstacle model to generate an optimal processing path, wherein the optimal processing path comprises a plurality of optimal processing segments and a plurality of optimal nodes, wherein the ant colony algorithm comprises performing a plurality of path generation operations between positions of the plurality of optimal poses to generate the plurality of optimal processing segments; and on the obstacle model in the virtual environment, based on the optimal processing path, simulating that an end point of the processing tool model on the mechanical arm model sequentially with poses corresponding to the plurality of optimal nodes performs a virtual processing operation on the plurality of processing point positions, thereby generating a simulation result.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2 is a flow chart of a processing path planning simulation method illustrated in some embodiments of the present disclosure.

DETAILED DESCRIPTION

Figure 1:
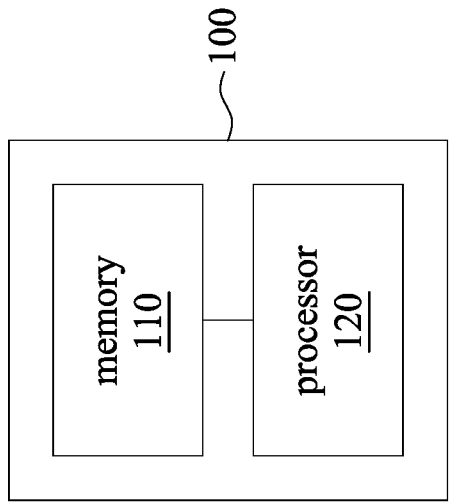
FIG. 1 is a block diagram of a processing path planning simulation device illustrated in some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In the prior art, a lot of break time costs and time costs are often caused. Since in order to avoid obstacles, many auxiliary points have to be arranged to bypass, and the mechanical arm will be far away from processing points during changeover processes, which will make path planning not optimal (i.e., a processing path is not shortest, and overall time is not shortest). These are all problems caused by relying on a lot of human determining.

In view of this, the present disclosure proposes a processing path planning simulation device and method, which allows a user to first input an obstacle model, a mechanical arm model, a processing tool model, and a model position relative relationship and a production strategy parameter thereby simulating a real field, and based on the obstacle model, the mechanical arm model, the processing tool model, the model position relative relationship and the production strategy parameter, collision test simulations and an ant colony algorithm are performed to generate an optimal processing path.

By doing this method, the problem that a result of manual path planning is often not optimal (e.g., the path from one processing point to another processing point is too far and not efficient enough) can be solved. Furthermore, the processing path planning simulation device and method proposed in the present disclosure can simulate the processing path in advance, which can greatly reduce the break time costs and the time costs due to the time spent on manual teaching and programming that would occupy a physical machine. This will improve the result of the manual path planning, resulting in a shorter processing path and shorter processing time. In addition, in iterative stages of the ant colony algorithm, path generation operation and collision detection mechanism are combined, which will greatly reduce the time required for the calculation.

Reference is made to FIG. 1, which is a block diagram of a processing path planning simulation device 100 illustrated in some embodiments of the present disclosure. As shown in FIG. 1, the processing path planning simulation device 100 includes a memory 110 and a processor 120. The memory 110 and the processor 120 are connected to each other.

In some embodiments, the processing path planning simulation device 100 can be implemented by an electronic device such as a smart phone, a tablet computer, a notebook, a desktop computer, a relay device or a server.

In this embodiment, the memory 110 stores instructions accessed by the processor 120, which are used for performing detailed steps described in subsequent paragraphs. In some embodiments, the memory 110 can be implemented by a memory unit, a flash memory, a read-only memory, a hard disk, or any equivalent storage component. In some embodiments, the processor 120 can be implemented by a processing unit, a central processing unit, or a computing unit.

Reference is made to FIG. 2 together, which is a flow chart of the processing path planning simulation method illustrated in some embodiments of the present disclosure. The components in the processing path planning simulation device 100 in FIG. 1 are used for performing steps S210-S240 in the processing path planning simulation method. As shown in FIG. 2, firstly, in step S210, according to the obstacle model in a virtual environment, multiple processing point positions on the obstacle model, the mechanical arm model in the virtual environment, a processing tool model on the mechanical arm model, the model position relative relationship and the production strategy parameter, collision test simulations are performed to generate multiple candidate poses of the mechanical arm model, where the multiple candidate poses are divided into multiple pose groups, where the multiple pose groups respectively correspond to the multiple processing point positions.

In some embodiments, the processing path planning simulation device 100 can further include an input interface (not shown), and the obstacle model in the virtual environment, the multiple processing point positions on the obstacle model, the mechanical arm model in the virtual environment, a processing tool model on the mechanical arm model, the model position relative relationship and the production strategy parameter can be input through this input interface.

In some embodiments, the obstacle model can be a stereoscopic three-dimensional model in a three-dimensional virtual environment, and can be a stereoscopic three-dimensional model generated by virtualizing an object (e.g., a printed circuit board (PCB)) to be processed. For example, a 3D CAD file of a stereoscopic three-dimensional model of the printed circuit board can be input through a user interface, and the three-dimensional virtual environment in which the stereoscopic three-dimensional model exists is simulated. In some embodiments, the multiple processing point positions can be preset on the obstacle model. For example, a specific line of a virtualized printed circuit board can be set as the processing point position.

In some embodiments, the mechanical arm model can be another stereoscopic three-dimensional solid model in the three-dimensional virtual environment, and can be a stereoscopic three-dimensional model which a real mechanical arm is virtualized to. For example, a 3D CAD file of a stereoscopic three-dimensional model of the mechanical arm can be input through the user interface, and a three-dimensional virtual environment in which the stereoscopic three-dimensional model exists can be simulated. In some embodiments, the processing tool model on the mechanical arm model can be a virtual processing tool such as a virtual glue dispensing tool or a screw locking tool set on the mechanical arm model in a three-dimensional virtual environment. For example, a 3D CAD file of a stereoscopic three-dimensional model of a glue dispensing tool or a screw locking tool can be input through the user interface, and a three-dimensional virtual environment in which the stereoscopic three-dimensional model exists is simulated.

In some embodiments, the model position relative relationship can include a relative assembly relationship, which is between the mechanical arm model and the processing tool model, and a pose relative relationship, which is between the obstacle model and the mechanical arm model, in the three-dimensional virtual environment.

In other words, the obstacle model, the mechanical arm model and the processing tool model all simulate real objects (e.g., a panel to be processed and a mechanical arm with the glue dispensing tool) in a real field (e.g., a factory).

Figure 3:
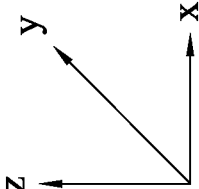
FIG. 3 is a schematic diagram of an obstacle model in a virtual environment illustrated in some embodiments of the present disclosure.

Reference is made to FIG. 3 together, which is a schematic diagram of the obstacle model OM in the virtual environment SE illustrated in some embodiments of the present disclosure. As shown in FIG. 3, the virtual environment SE is a virtual three-dimensional space (i.e., with x, y, z directions), where the virtual environment SE can be divided into multiple grids, where these grids are adjusted by object grid resolution, each grid can indicate one coordinate, and such the grid can facilitate coordinate identification for subsequent collision test simulations. In addition, there is the one obstacle model OM in the virtual environment SE, and the obstacle model OM is a stereoscopic three-dimensional model (e.g., the grids which the obstacle model OM exists in indicate corresponding multiple coordinates), where multiple virtual processing points PP1-PP4 exists on the obstacle model OM (e.g., grids with the virtual processing points PP1-PP4 also indicates corresponding multiple coordinates). The virtual processing points PP1-PP4 are used for simulating points to be processed for manufacturing on the obstacle model OM.

Figure 4:
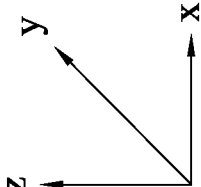
FIG. 4 is a schematic diagram of a mechanical arm model in a virtual environment illustrated in some embodiments of the present disclosure.

Reference is made to FIG. 4 together, which is a schematic diagram of the mechanical arm model MAM in the virtual environment SE illustrated in some embodiments of the present disclosure. As shown in FIG. 4, the mechanical arm model MAM can also exist in the virtual environment SE of FIG. 3 (e.g., the grids of the mechanical arm model MAM indicate corresponding multiple coordinates), and the processing tool model ST can be disposed at an end of the mechanical arm model MAM (e.g., the grids in which the processing tool model ST exists indicates corresponding multiple coordinates).

In some embodiments, the production strategy parameter can include a collision safety distance, a lateral offset distance, a longitudinal offset distance, a vertical direction distance difference, an inclination angle difference and an azimuth angle difference. In some embodiments, for each of the multiple processing point positions, according to the lateral offset distance, the longitudinal offset distance, the vertical direction distance difference, the inclination angle difference and the azimuth angle difference, multiple collision test positions of the end point of the processing tool model ST on the mechanical arm model MAM can be generated. Next, for each of the multiple processing point positions, multiple collision test poses of the mechanical arm model MAM are generated according to the multiple collision test positions, and multiple non-collision poses from the multiple collision test poses are selected according to the collision safety distance, the multiple collision test poses and the virtual obstacle model, where the mechanical arm model MAM indicates six-dimensional (6 degree of freedom, 6DOF) coordinates (i.e., three translational degrees of freedom and three rotational degrees of freedom) of multiple reference points on the mechanical arm model MAM, where the multiple reference points include the end point of the processing tool model ST on the mechanical arm model MAM.

It should be noted that the present disclosure provides the user with input of different manufacturing strategies as the production strategy parameter, and the path planning by incorporating these strategy information can be safe and feasible. In some embodiments, the production strategy parameter further includes but is not limited to tracking or static processing options, front or back processing options, a vertical lift parameter, a central radiation angle parameter, etc.

In some embodiments, these collision test poses indicate a six-dimensional coordinate of the end point of the processing tool model ST. In some embodiments, each joint of the mechanical arm model MAM, each mechanical part connected by each joint, the processing tool model ST and the end point of the processing tool model ST can be used as a reference point, and these reference points all have their own six-dimensional coordinates. In some embodiments, the processing tool model ST can be a virtualized glue dispensing tool or a virtualized screw locking tool or the like. For example, when the processing tool model ST is a virtualized screw locking tool, for each of the multiple processing point positions, the collision test positions of the end point of the processing tool model ST on the mechanical arm model MAM can be directly generated respectively at the multiple processing point positions. At this time, since the screw locking tool will not be processed in an inclined pose, the inclination angle difference of the processing tool model ST can be set equal to 0, and an azimuth angle difference can be set. In addition, due to processing characteristics of the screw locking tool, the screw locking tool needs to be in direct contact with the processing point position (i.e., the screw hole). Therefore, it is possible to set the lateral offset distance, the longitudinal offset distance and a vertical distance difference of the processing tool model ST to be equal to zero.

Figure 5B:
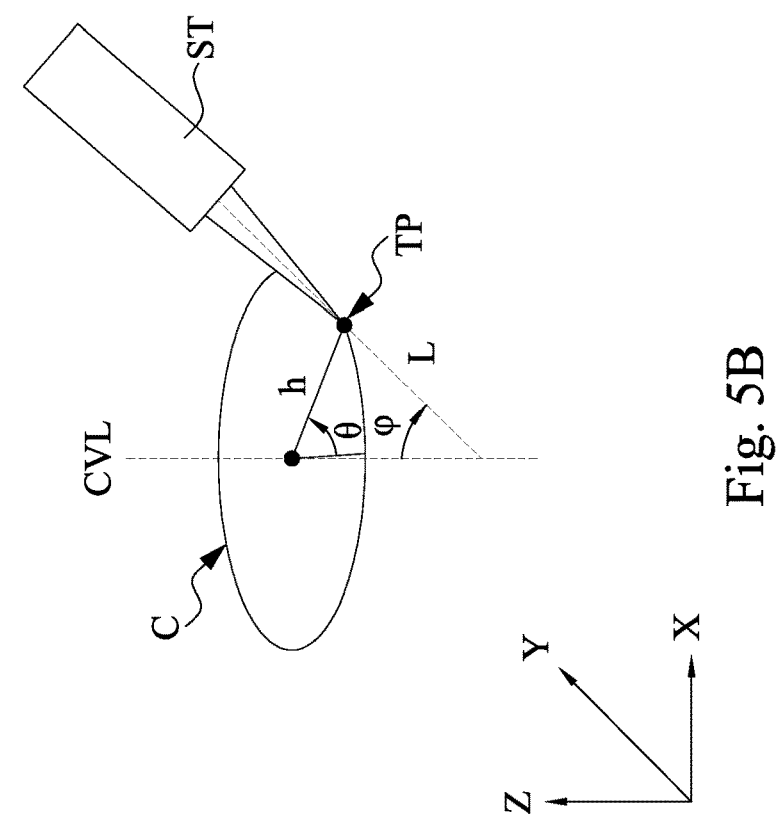
FIG. 5B is a schematic diagram of a partially enlarged view of an initial position in FIG. 5A.
Figure 5A:
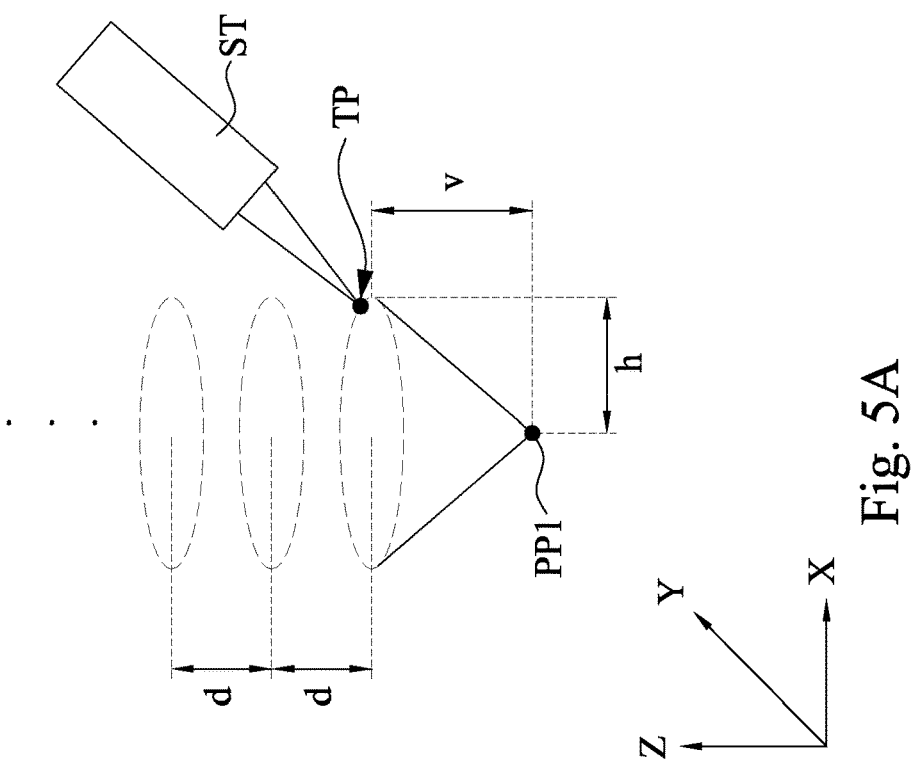
FIG. 5A is a schematic diagram of collision test simulations illustrated in some embodiments of the present disclosure.

Reference is made to FIG. 5A together, which is a schematic diagram of collision test simulations illustrated in some embodiments of the present disclosure. As shown in FIG. 5A, firstly, for the processing point position PP1, the horizontal offset distance h in a horizontal direction and the longitudinal offset distance v in a vertical direction exist between the end point TP of the processing tool model ST and the processing point position PP1, and a pointing direction of the processing tool model ST is a −z direction, so as to use this initial position as one collision test position. In this way, the pose of the mechanical arm model MAM can be adjusted according to the collision test position to generate one collision test pose. When the collision test pose can be generated, that the processing tool model ST performs virtual processing is simulated, and whether processing can be completed on the processing point position PP1 is determined. When the virtual processing can be completed, whether the processing tool model ST of the mechanical arm model MAM collides with the obstacle model OM in the collision test pose is determined. When there is no collision with the obstacle model OM, this collision test pose can be used as the non-collision pose.

In some embodiments, the method for determining whether the collision occurs can include: determining whether the end point TP of the processing tool model ST reaches the collision test pose by an inverse kinematics method, where, when the end point TP of the processing tool model ST reaches the collision test pose, in the collision test pose, whether multiple connecting rods between the multiple reference points in the mechanical arm model MAM and the processing tool model ST collide with the obstacle model OM is determined. It should be noted that this method can ignore a geometric space of the body itself of the mechanical arm model MAM, and because the calculation of this detection mechanism is low, it can be widely used in the iteration of path planning search (i.e., the iteration of the subsequent ant colony algorithm). In some embodiments, when the end point TP of the processing tool model ST reaches the collision test pose, in the collision test pose, whether a body structure of the mechanical arm model MAM, the multiple connecting rods between the multiple reference points in the mechanical arm model MAM and the coordinates of the processing tool model ST intersect with the coordinates of the obstacle model OM is determined. It should be noted that this method can ensure reliability of a detection result but the amount of calculation is large, and precise detection mechanism is performed only in key steps (e.g., after completing the subsequent ant colony algorithm, the precise detection mechanism can be performed for the entire path found), so that a goal of a high efficiency and reliable planning result can be achieved at the same time.

In some embodiments, in the collision test pose, whether a separation distance between one, which is included in the multiple connecting rods and the processing tool model ST, and one, which is included in the mechanical arm model MAM and the obstacle model OM is less than or equal to the collision safety distance is calculated. Next, when the separation distance is less than or equal to the collision safety distance, that the collision has occurred is determined.

Next, reference is made to FIG. 5B together, which is a schematic diagram of a partially enlarged view of the initial position in FIG. 5A. As shown in FIG. 5B, the pointing direction of the processing tool model ST can be adjusted so that the inclination angle difference φ exists between the pointing direction and a vertical extension line CVL (i.e., an intersection point exists between a center extension line L of the processing tool model ST and the vertical extension line CVL (parallel to a +z direction and below a circle C) passing through a center point of the circle C, and an included angle exists between the center extension line L of the processing tool model ST and the vertical extension line CVL passing through the center point of the circle C), and the end point TP of the processing tool model ST on circumference of the circle C with a radius of h is set, so as to determine whether another non-collision pose can be generated in the same way as above, where a z axis can be perpendicular to a circular plane of the circle C (i.e., perpendicular to the radius h of the circle C).

Next, the end point TP of the processing tool model ST can be rotated along the circle C by an angle difference θ, and the same method as above can be used for determining whether another non-collision pose can be generated. By analogy, a next collision test will perform by rotating another rotation angle difference θ until a sum of the rotation angles is equal to 360 degrees, then the included angle between the pointing direction of the processing tool model ST and the vertical extension line CVL will be further increased by the inclination angle difference φ, and the same process above is continued until the pointing direction of the processing tool model ST is adjusted so that a vertical included angle between the pointing direction and the vertical extension line CVL is equal to a preset angle (which can be set by the user first). When the sum of the rotation angles is equal to 360 degrees, the vertical included angle is equal to the preset angle, and any non-collision pose is generated, the collision test can be ended.

Next, when the sum of the rotation angles is equal to 360 degrees, the vertical included angle is equal to the preset angle, and no non-collision pose is generated, the end point TP of the processing tool model ST can be moved vertically upward by the vertical distance difference d, and the pointing direction of the processing tool model ST is set as the −z direction, so as to continue the collision test in the same method as above to generate other non-collision poses until the pointing direction of the processing tool model ST is adjusted again so that the vertical included angle between the pointing direction and the vertical extension line CVL is equal to the above preset angle. When the sum of the rotation angles is equal to 360 degrees, the vertical included angle is equal to the preset angle, and any non-collision pose is generated, the collision test can also be ended. By analogy, when the sum of the rotation angles is equal to 360 degrees, the vertical included angle is equal to the preset angle, and no non-collision pose has been generated, any non-collision pose can be generated by continuously moving up until moving N vertical direction distance differences d, where N can be a preset positive integer. Finally, other non-collision poses can also be generated in the same way for other processing point positions PP2-PP4 in FIG. 3.

Moreover, as shown in FIG. 2, in step S220, a path optimization algorithm is performed on multiple candidate poses to generate a pose sequence, where the pose sequence includes multiple optimal poses arranged in sequence. In some embodiments, the path optimization algorithm can be a mathematical programming algorithm, a heuristic algorithm, a metaheuristic algorithm, or the like. In some embodiments, by the mathematical programming algorithm, the heuristic algorithm, or the metaheuristic algorithm, respective optimal poses can be selected from the multiple pose groups and an arrangement order of the multiple optimal poses can be generated. Next, a pose sequence can be generated according to the multiple optimal poses and the arrangement order.

Figure 6:
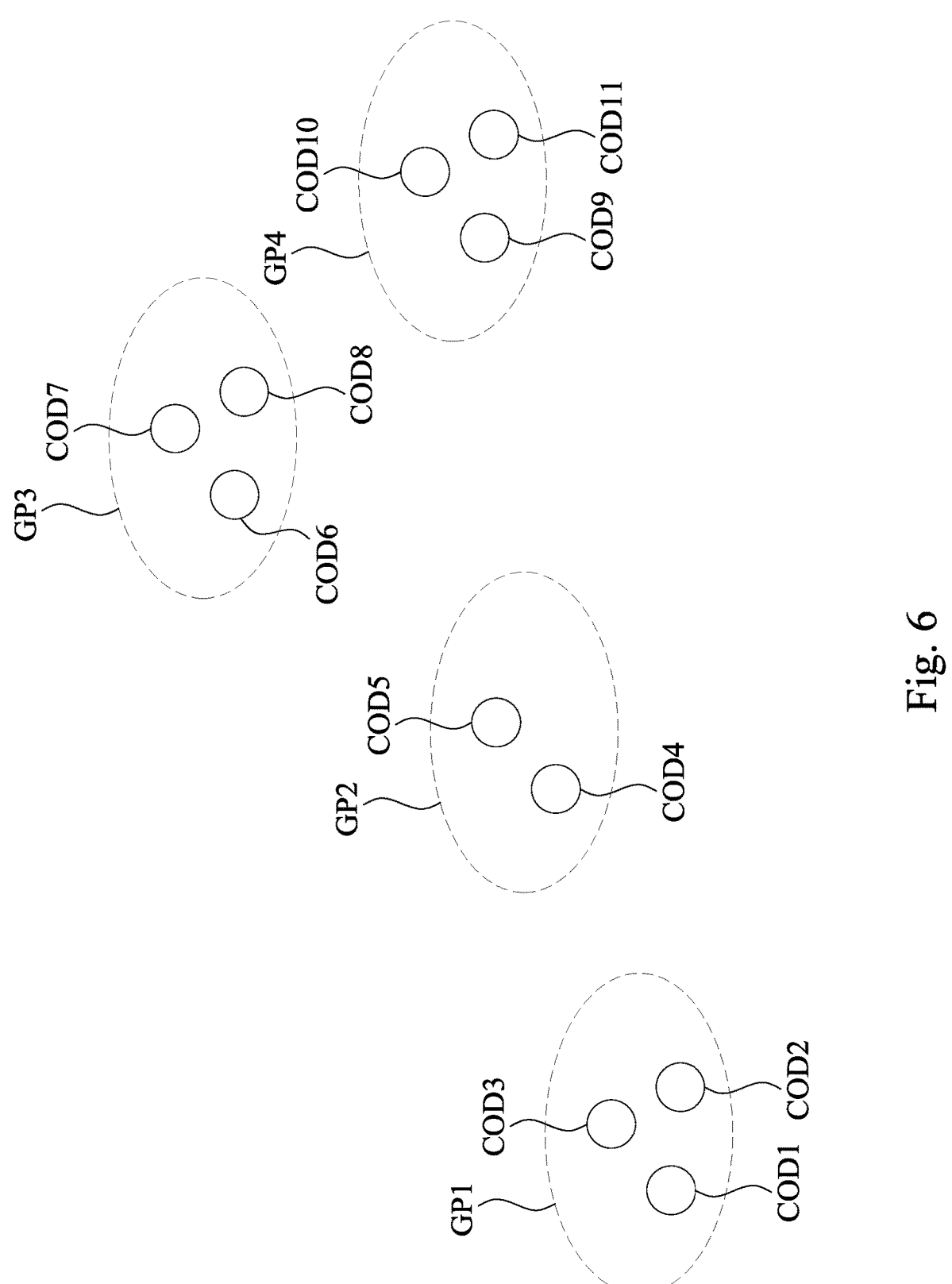
FIG. 6 is a schematic diagram of multiple pose groups illustrated in some embodiments of the present disclosure.

The pose groups disclosed in the present disclosure are further described below with practical examples. Reference is made to FIG. 6 together, which is a schematic diagram of multiple pose groups GP1-GP4 illustrated in some embodiments of the present disclosure. As shown in FIG. 6, the pose group GP1 includes candidate poses of multiple positions COD1-COD3, the pose group GP2 includes candidate poses of multiple positions COD4-COD5, and the pose group GP3 includes candidate poses of multiple positions COD6-COD8, and the pose group GP4 include candidate poses of multiple positions COD9-COD11, where the pose groups GP1-GP4 respectively correspond to the processing point positions PP1-PP4 in FIG. 3. In detail, the pose group GP1 is composed of the candidate poses of the positions COD1-COD3 around the processing point position PP1, the pose group GP2 is composed of the candidate poses of the positions COD4-COD5 around the processing point position PP2, the pose group GP3 is composed of the candidate poses of the positions COD6-COD8 around the processing point position PP3, and the pose group GP4 is composed of the candidate poses of the positions COD9-COD11 around the processing point position PP4.

Figure 7:
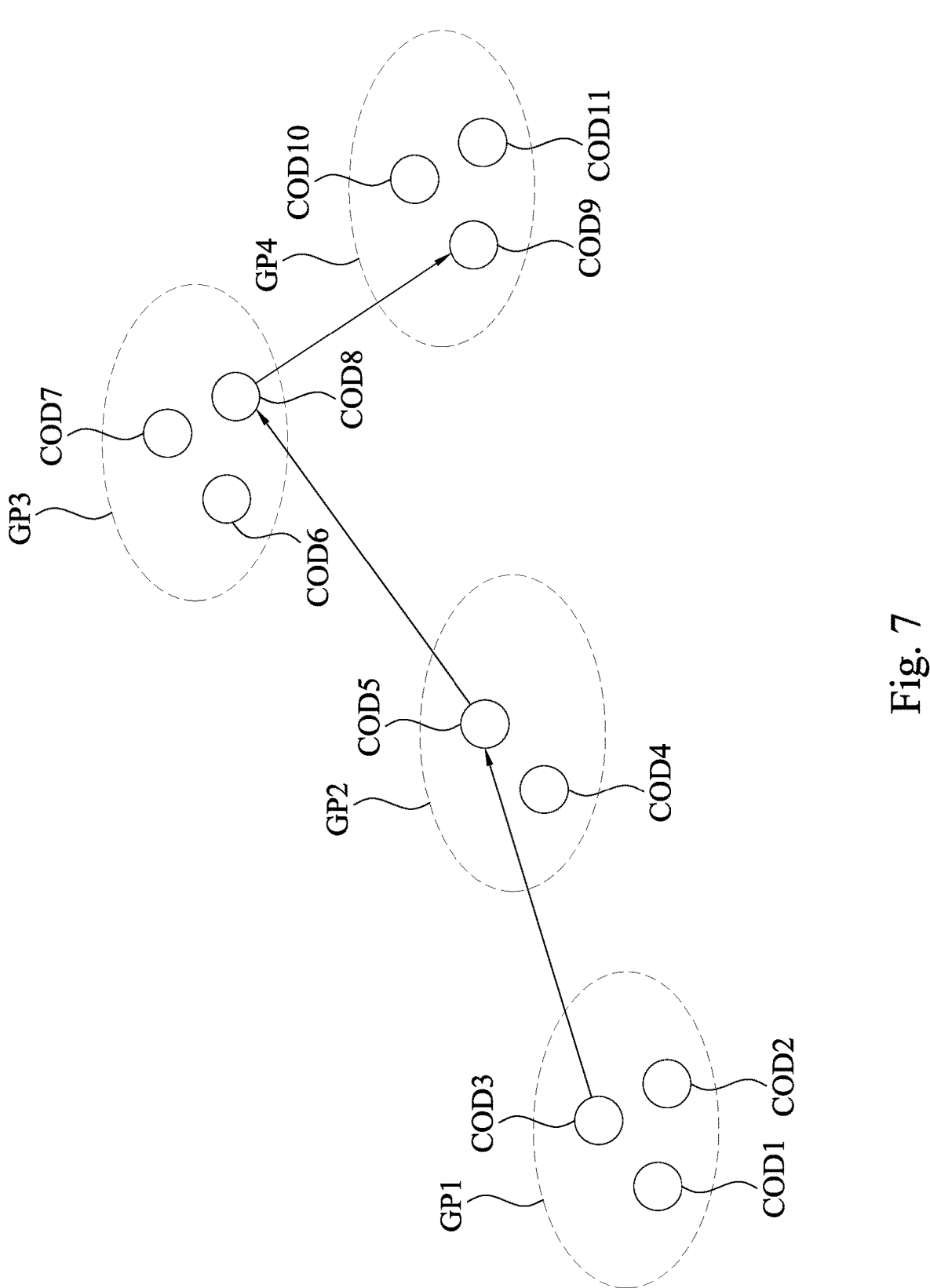
FIG. 7 is a schematic diagram of generating a pose sequence illustrated in some embodiments of the present disclosure.

Reference is made to FIG. 7 together, which is a schematic diagram of generating the pose sequence illustrated in some embodiments of the present disclosure. As shown in FIG. 7, one candidate pose can be respectively selected from the pose groups GP1-GP4 by the mathematical programming algorithm, the heuristic algorithm or the metaheuristic algorithm, and the combination of these candidate poses will have a shortest path sum. In detail, when the mathematical programming algorithm, the heuristic algorithm or the metaheuristic algorithm is performed on the pose groups GP1-GP4, it can calculate that a path generated by the position COD3, the position COD5, the position COD8 and the position COD9 has the shortest path sum. Therefore, the candidate pose of position COD3, the candidate pose of position COD5, the candidate pose of position COD8 and the candidate pose of position COD9 can be used as the multiple optimal poses arranged in sequence, and the multiple optimal poses arranged in sequence can be used as the posture sequence. In other words, the mechanical arm model MAM is to sequentially adopt the candidate pose of position COD3, the candidate pose of position COD5, the candidate pose of position COD8 and the candidate pose of position COD9, so as to perform simulated processing on the processing point positions PP1-PP4 in FIG. 3.

Furthermore, in step S230, the ant colony algorithm is performed based on the pose sequence and the obstacle model OM to generate the optimal processing path, where the optimal processing path includes multiple optimal processing segments and multiple optimal nodes, where the ant colony algorithm includes performing the multiple path generation operations between positions of the multiple optimal poses to generate the multiple optimal processing segments (i.e., optimal mechanical arm movement edges or line segments). In some embodiments, the ant colony algorithm is performed based on the pose sequence, the obstacle model OM and the mechanical arm model MAM in the same time.

In some embodiments, between positions of arranged adjacent two of the multiple optimal poses, the multiple path generation operations is performed to generate the multiple candidate processing segments and the multiple candidate nodes, and the ant colony algorithm is performed according to an ant quantity parameter and an iterative number to select the multiple optimal processing segments and the multiple optimal nodes from the multiple candidate processing segments and the multiple candidate nodes. In some embodiments, the iterative number indicates a total number of times, which the multiple iterative stages are performed. In some embodiments, the path generation operation can include: according to positions of arranged adjacent two of the plurality of optimal poses, the collision safety distance and a plurality of coordinates corresponding to the obstacle model OM, the multiple candidate processing segments and the multiple candidate nodes are generated.

Figure 8:
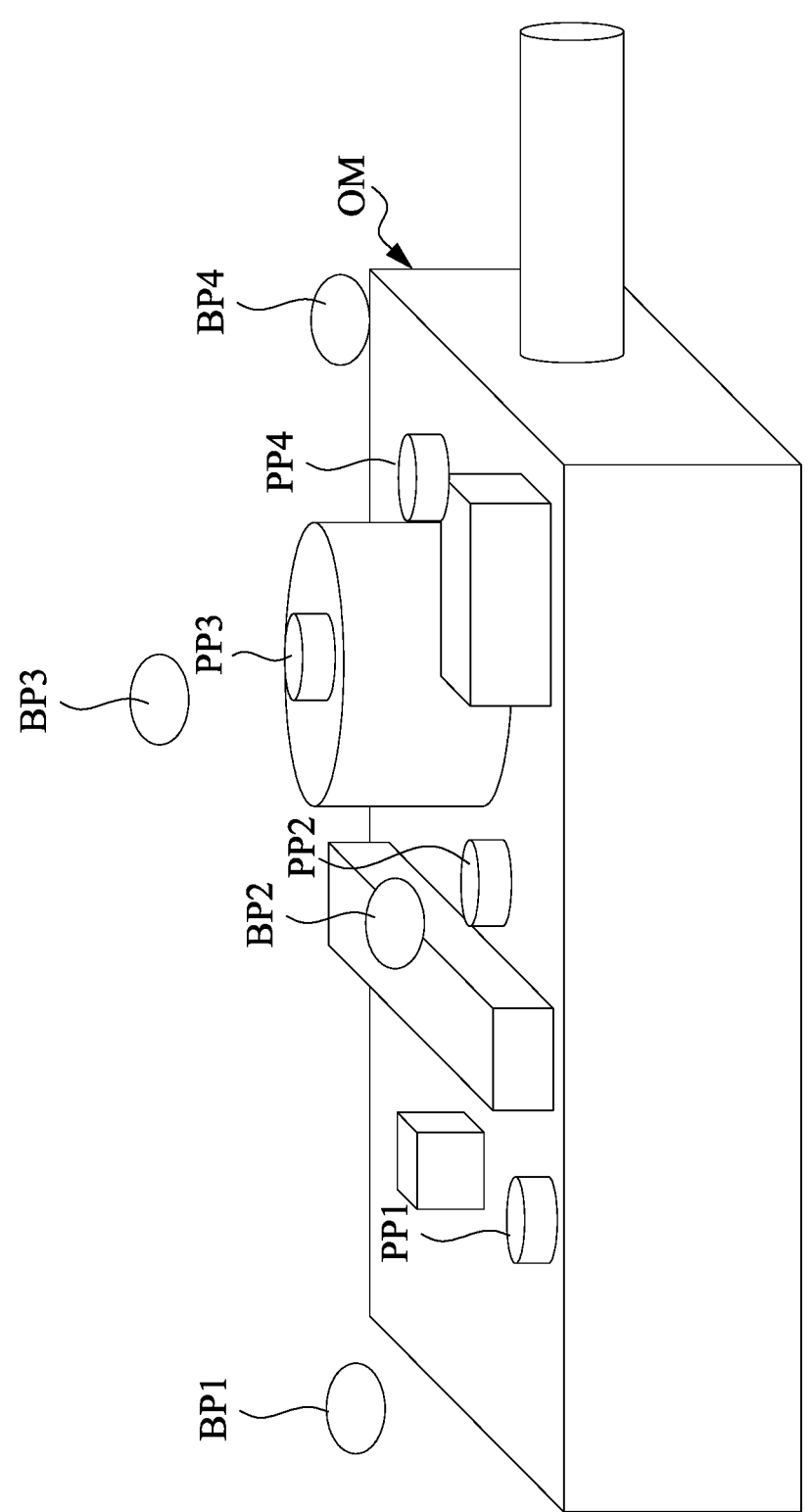
FIG. 8 is a schematic diagram of positions of multiple optimal poses illustrated in some embodiments of the present disclosure.

The following practical examples further illustrate the generation of the optimal processing segment of the present disclosure. Reference is made to FIG. 8, which is a schematic diagram of positions BP1-BP4 of the multiple optimal poses illustrated in some embodiments of the present disclosure. As shown in FIG. 8, the positions BP1-BP4 of the optimal poses are located near the processing point positions PP1-PP4, respectively. For the convenience of description, the optimal processing segments are generated between the positions BP1-BP2 of the optimal poses for illustration.

Figure 9A:
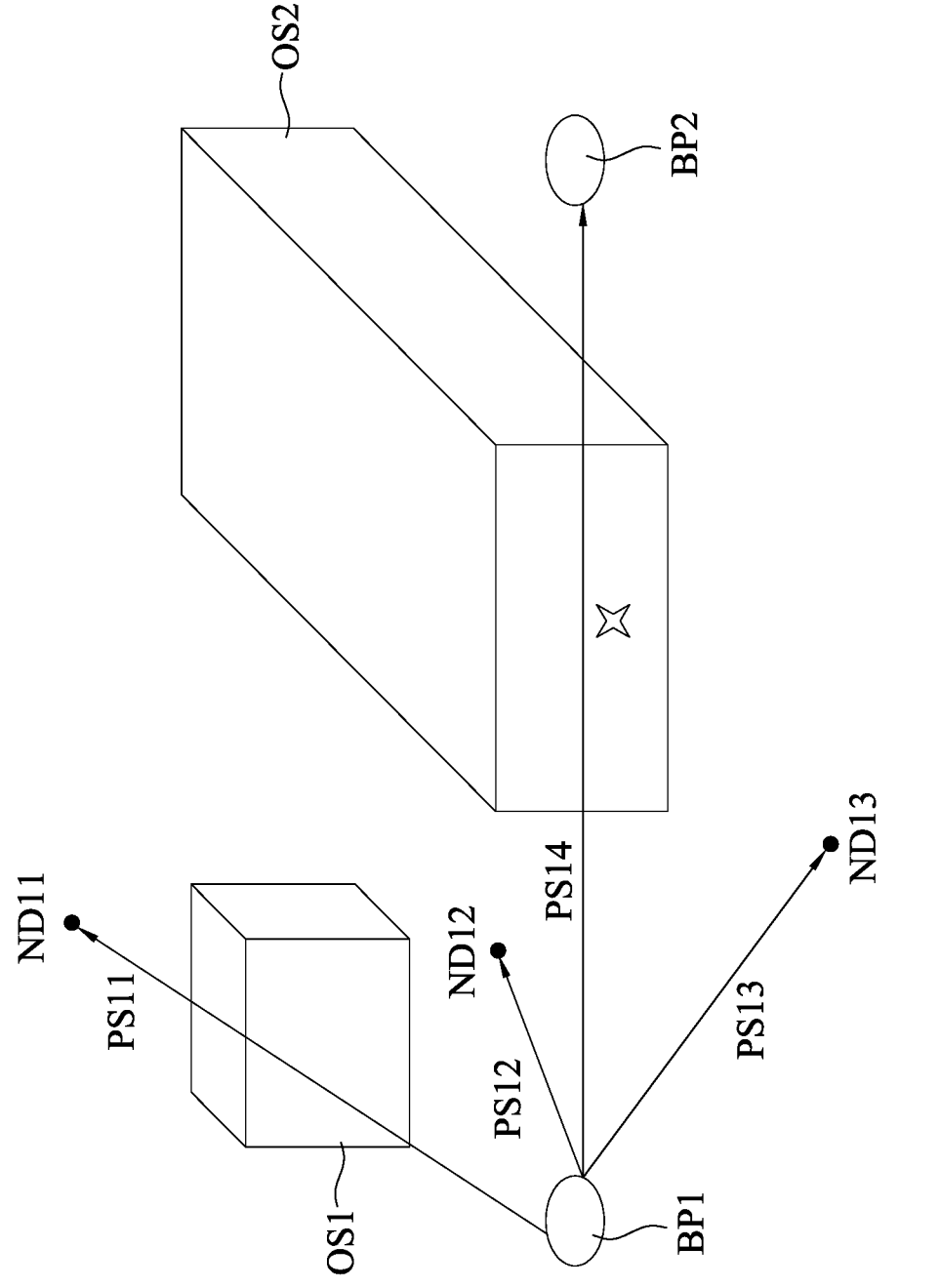
FIG. 9A is a schematic diagram of a first step in first selection between positions of arranged adjacent two of the multiple optimal poses illustrated in some embodiments of the present disclosure.

Reference is made to FIG. 9A together, which is a schematic diagram of a first step in first selection between positions of arranged adjacent two of the multiple optimal poses illustrated in some embodiments of the present disclosure. As shown in FIG. 9A, two simulated obstacles OS1 and OS2 exist near the positions BP1 and BP2 of the optimal poses, and it is desired to find the optimal processing segments between the positions BP1 and BP2. At this time, one of the iterative phases can be performed.

In this iterative stage, four candidate processing segments PS11-PS14 (assuming that four are generated each time) and three corresponding candidate nodes ND11-ND13 can be generated by a path generation operation. In addition, by the same method as the above-mentioned collision test, it identifies that the end point TP of the processing tool model ST on the mechanical arm model MAM located on the candidate processing segments PS11-PS13 and candidate nodes ND11-ND13 will not collide with the simulated obstacles OS1 and OS2 (i.e., the candidate processing segment PS14 will occur a collision). Assuming that the ant quantity parameter is set as 3, the iterative number is set as 4, and initial pheromone concentrations of the candidate processing segments PS11-PS13 is set as $\tau_0$ (a preset constant), in the first selection of a first iteration (i.e., a first ant), one of the candidate processing segments PS11-PS13 can be selected based on a selection probability, where the selection probability is shown in a following equation (1).

$$p_{ij}^{k} = \frac{(\tau_{ij}^{\alpha})(\eta_{ij}^{\beta})}{\sum_{all\,z}(\tau_{iz}^{\alpha})(\eta_{iz}^{\beta})} \qquad \text{equation (1)}$$

Where $$p_{ij}^{k}$$

is a probability of a k-th ant from a candidate node i to a candidate node j, $\tau_{ij}$ is the pheromone concentration on a path between the candidate nodes i and j (at this time, the pheromone concentration of all candidate processing segments is $$\tau_{0)},$$

$\eta_{ij}$ is an expected value, which is a reciprocal of a shortest path length between the candidate nodes i and j (e.g., the reciprocal of the shortest path length from the position BP1 to the candidate node ND11), z is all candidate nodes that can be reached from the candidate node i (i.e., the candidate nodes ND11-ND13 can be reached from the position BP1), α is a pheromone index item, β is a distance reciprocal index term, and α, β are parameters used for identifying the relative importance of pheromones and distances. At this time, a shorter path has a higher selection probability (e.g., the candidate processing segment PS12 in FIG. 9A).

Figure 9B:
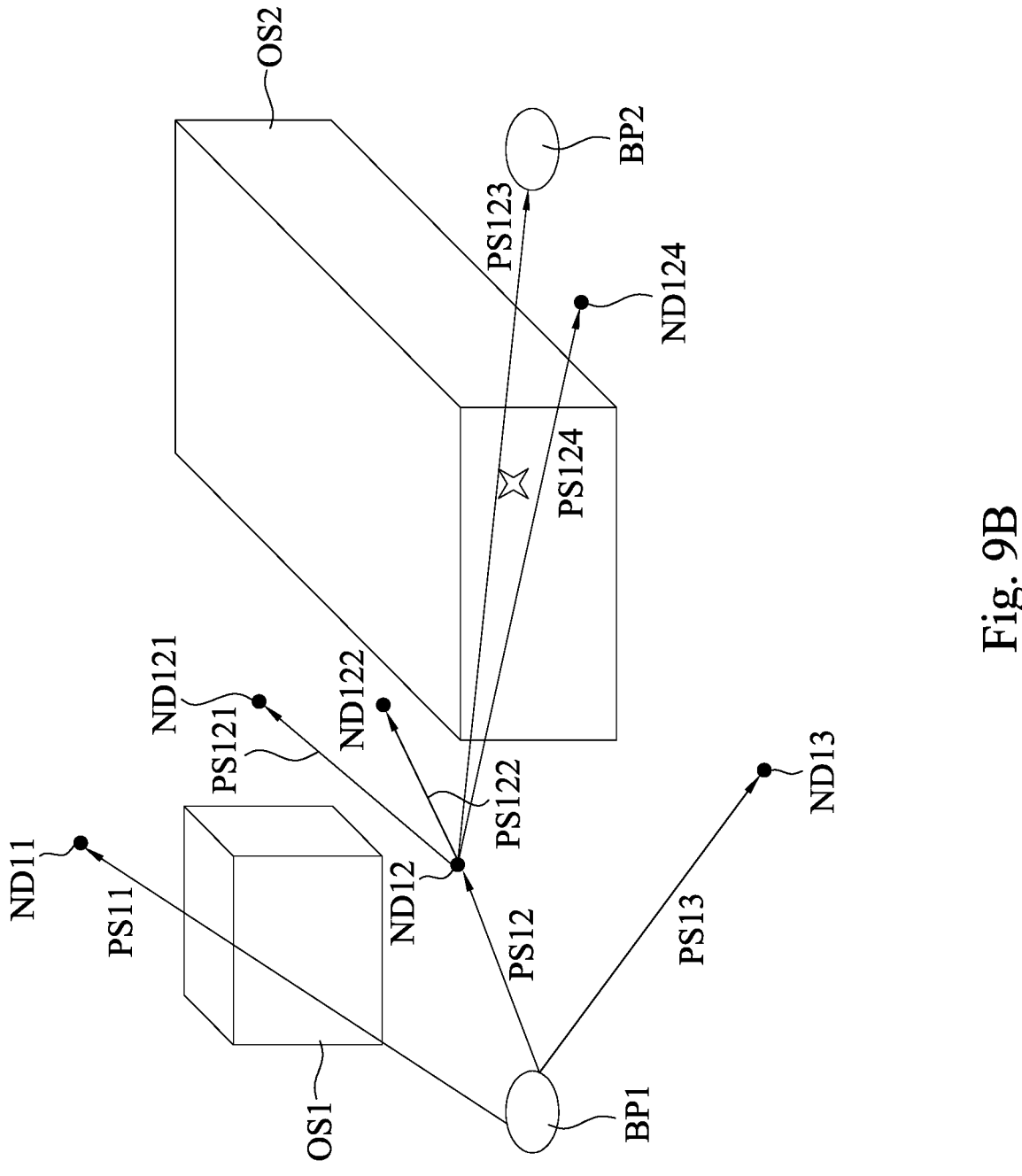
FIG. 9B is a schematic diagram of a second step in the first selection between the positions of the arranged adjacent two of the multiple optimal poses illustrated in some embodiments of the present disclosure.

Reference is made to FIG. 9B together, which is a schematic diagram of a second step in the first selection between the positions of the arranged adjacent two of the multiple optimal poses illustrated in some embodiments of the present disclosure. As shown in FIG. 9B, when the candidate processing segment PS12 is selected, four candidate processing segments PS121-PS124 and corresponding four candidate nodes ND121-ND124 can be generated by the path generation operation. In addition, by the same method as the above-mentioned collision test, it identifies that the end point TP of the processing tool model ST on the mechanical arm model MAM located on the candidate processing segments PS121-PS122 and the candidate nodes ND121-ND122 will not collide with the simulated obstacles OS1 and OS2 (i.e., the candidate processing segments PS123-PS124 will occur a collision). Next, the selection probability can be calculated based on the same method as above to select one of the candidate processing segments PS121-PS122.

Figure 9C:
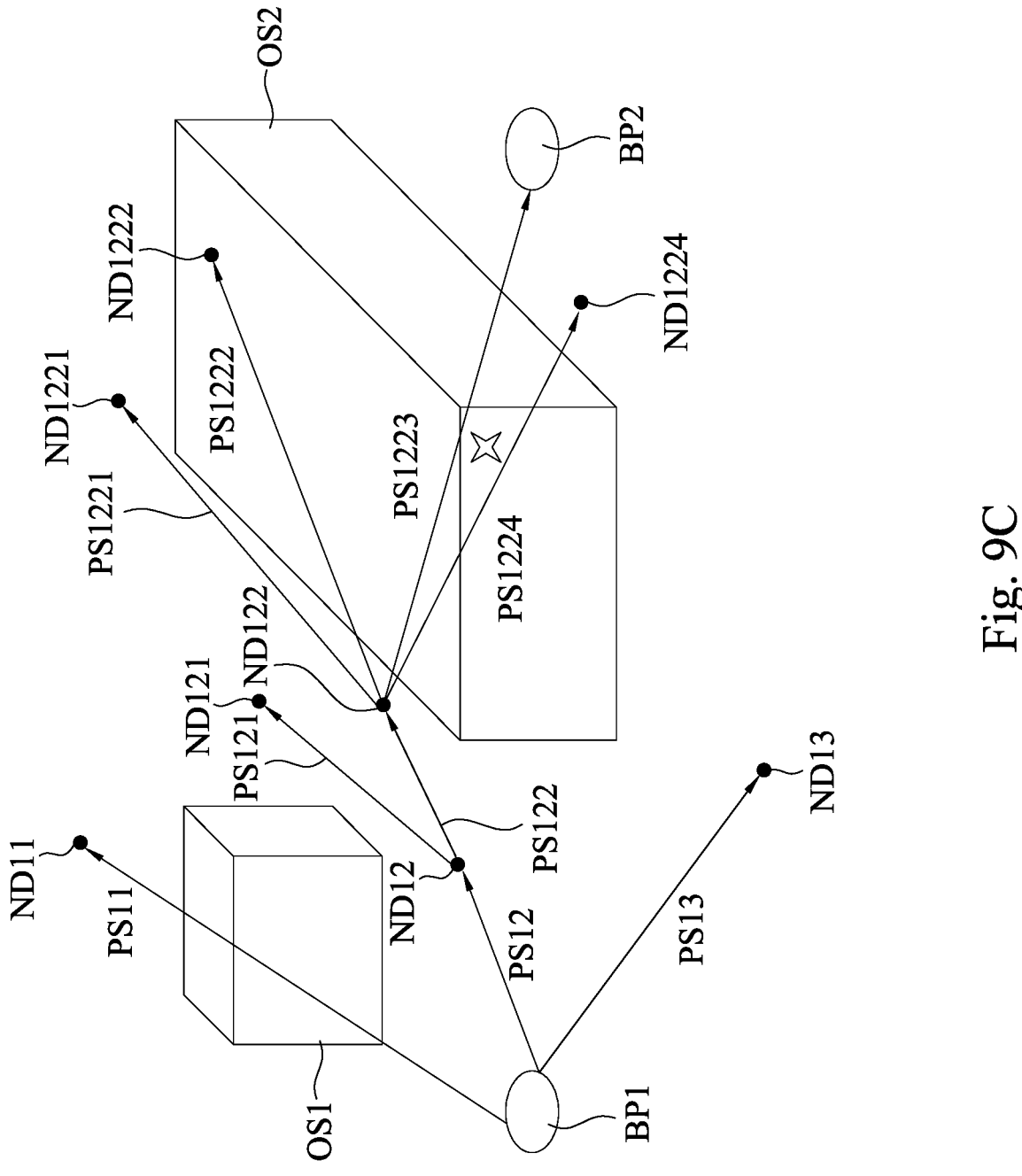
FIG. 9C is a schematic diagram of a third step in the first selection between the positions of the arranged adjacent two of the multiple optimal poses illustrated in some embodiments of the present disclosure.

Reference is made to FIG. 9C together, which is a schematic diagram of a third step in the first selection between the positions of the arranged adjacent two of the multiple optimal poses illustrated in some embodiments of the present disclosure. As shown in FIG. 9C, when the candidate processing segment PS122 is selected, four candidate processing segments PS1221-PS1224 and corresponding four candidate nodes ND1221-ND1224 can be generated by the path generation operation. In addition, by the same method as the above-mentioned collision test, it identifies that the end point TP of the processing tool model ST on the mechanical arm model MAM located on the candidate processing segments PS1221-PS1222 and the candidate nodes ND1221-ND1223 will not collide with the simulated obstacles OS1 and OS2 (i.e., the candidate processing segment PS1224 will occur a collision). Next, the selection probability can be calculated based on the above-mentioned same method to select one of the candidate processing segments PS1221-PS1223.

Figure 9D:
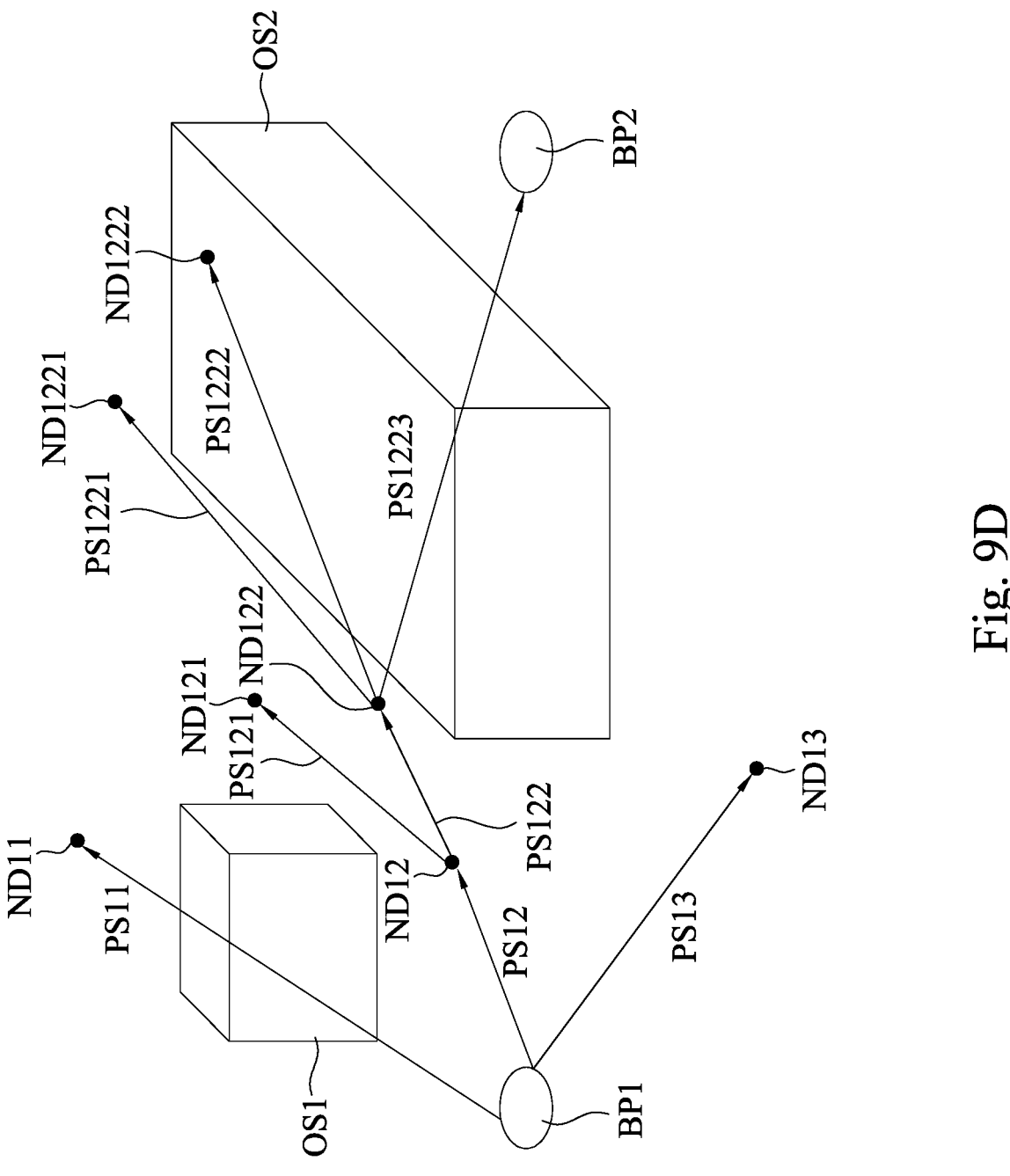
FIG. 9D is a schematic diagram of multiple candidate processing segments generated for the first selection between the positions of the arranged adjacent two of the multiple optimal poses illustrated in some embodiments of the present disclosure.

Reference is made to FIG. 9D together, which is a schematic diagram of multiple candidate processing segments PS11-PS1223 generated for the first selection between the positions of the arranged adjacent two of the multiple optimal poses illustrated in some embodiments of the present disclosure. As shown in FIG. 9D, at this time, the candidate processing segments PS11-PS13, the candidate processing segments PS121-PS122, and the candidate processing segments PS1221-PS1223 can be generated in the first selection. When the candidate processing segment PS1223 is selected and the position BP2 is reached, a path of the first selection can include the candidate processing segments PS12, PS122 and PS1223.

Figure 10A:
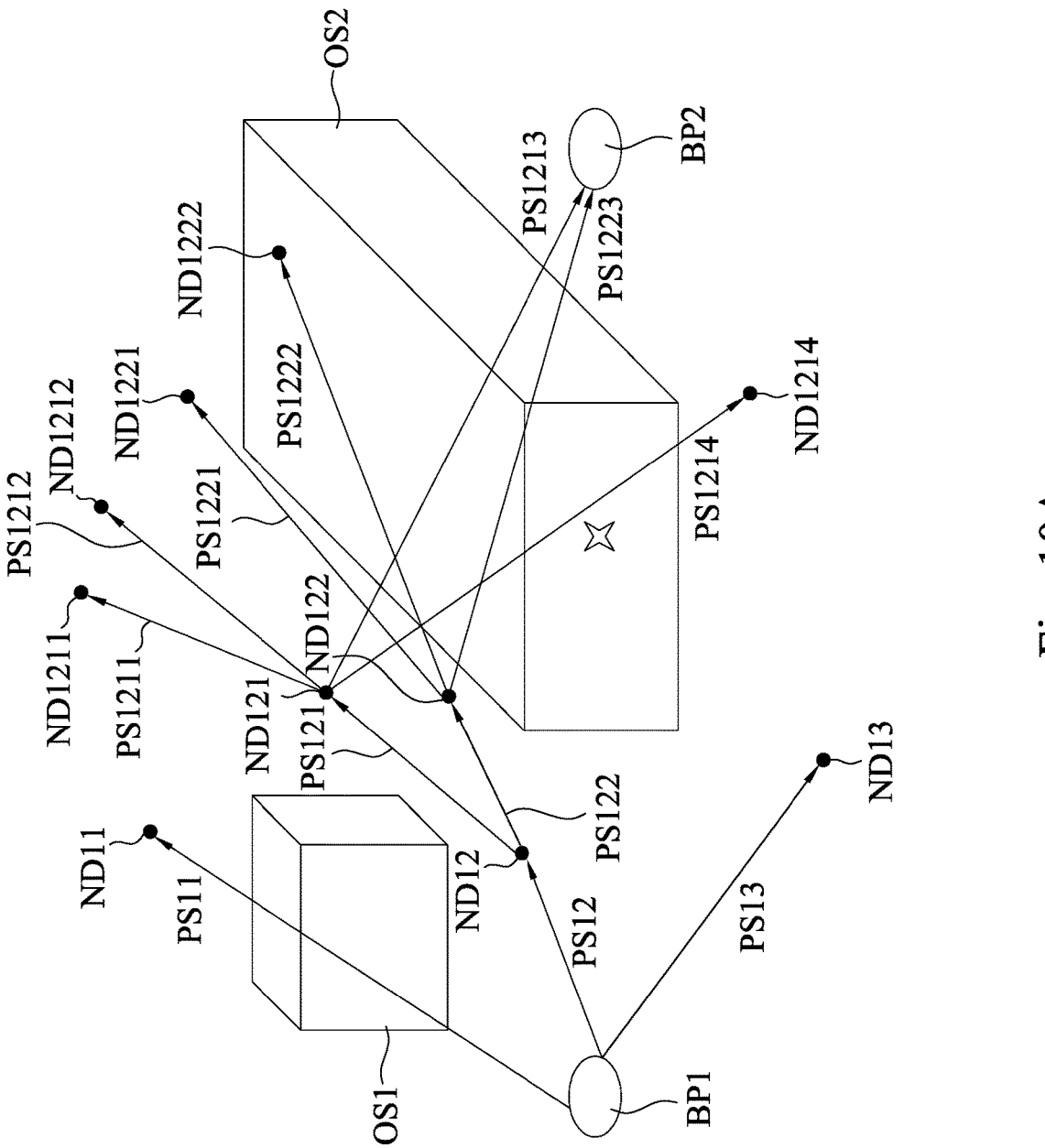
FIG. 10A is a schematic diagram of one of steps of second selection between the positions of the arranged adjacent two of the multiple optimal poses illustrated in some embodiments of the present disclosure.

Reference is made to FIG. 10A together, which is a schematic diagram of one of steps of second selection between the positions of the arranged adjacent two of the multiple optimal poses illustrated in some embodiments of the present disclosure. As shown in FIG. 10A, assuming that the candidate processing segments PS12 and PS121 are firstly selected in second selection in the first iteration based on the previously calculated selection probability, four candidate processing segments PS1211-PS1214 and three corresponding candidate nodes ND1211-ND1212 and ND1214 can be generated by a path generation operation. In addition, by the same method as the above-mentioned collision test, it identifies that the end point TP of the processing tool model ST on the mechanical arm model MAM located on the candidate processing segments PS1211-PS1213 and candidate nodes ND1211-ND1212 will not collide with the simulated obstacles OS1 and OS2 (i.e., the candidate processing segment PS1214 will occur a collision). Next, the selection probability can be calculated based on the above-mentioned same method to select one of the candidate processing segments PS1211-PS1213.

Figure 10B:
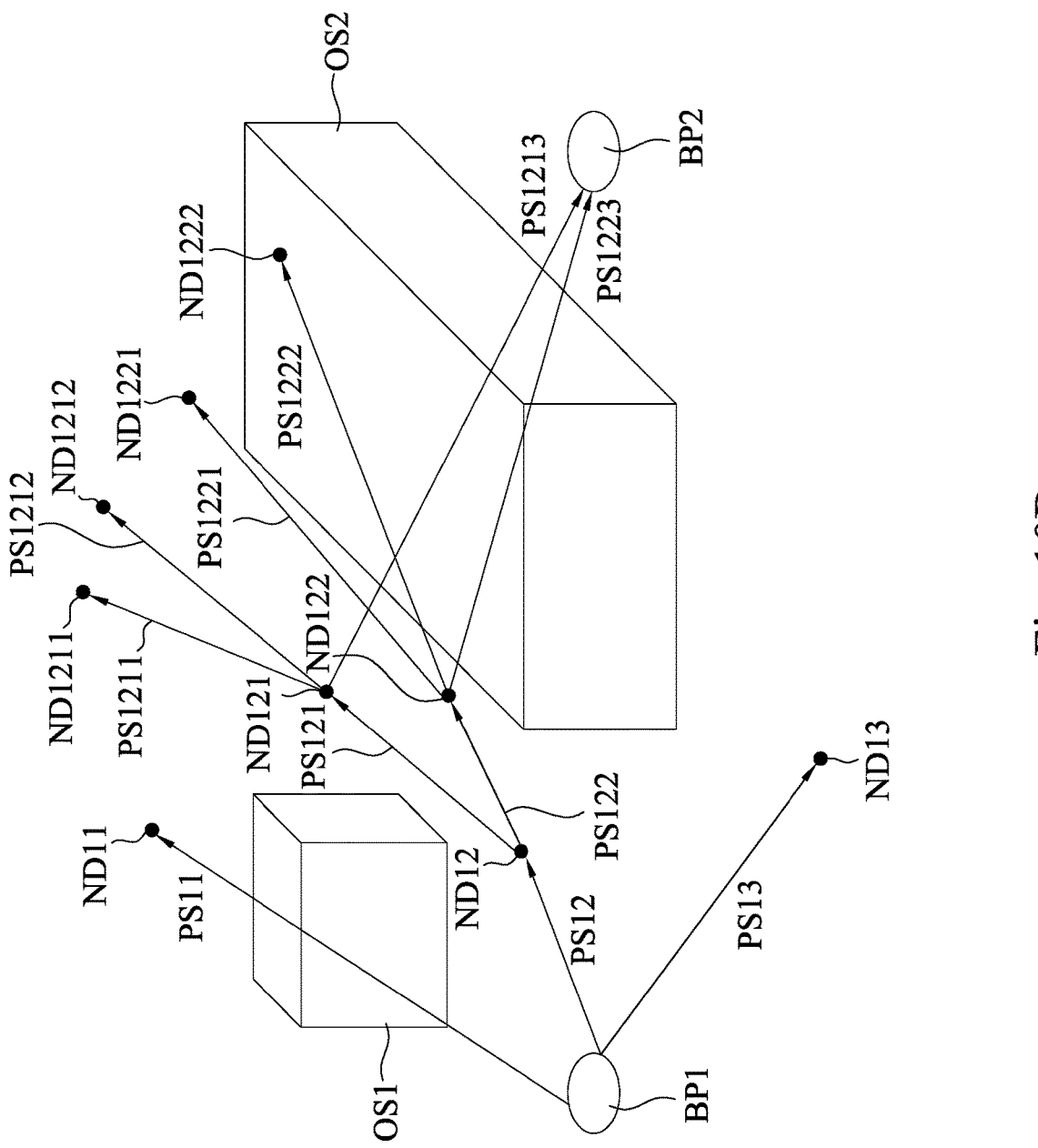
FIG. 10B is a schematic diagram of multiple candidate processing segments generated by the second selection between the positions of the arranged adjacent two of the multiple optimal poses illustrated in some embodiments of the present disclosure.

Reference is made to FIG. 10B together, which is a schematic diagram of multiple candidate processing segments PS11-PS1223 generated by the second selection between the positions of the arranged adjacent two of the multiple optimal poses illustrated in some embodiments of the present disclosure. As shown in FIG. 10B, at this time, candidate processing segments PS1211-PS1213 can be generated in the second selection. When the candidate processing segment PS1213 is selected and the position BP2 is reached, a path of the second selection may include the candidate processing segments PS12, PS121 and PS1213.

Figure 11A:
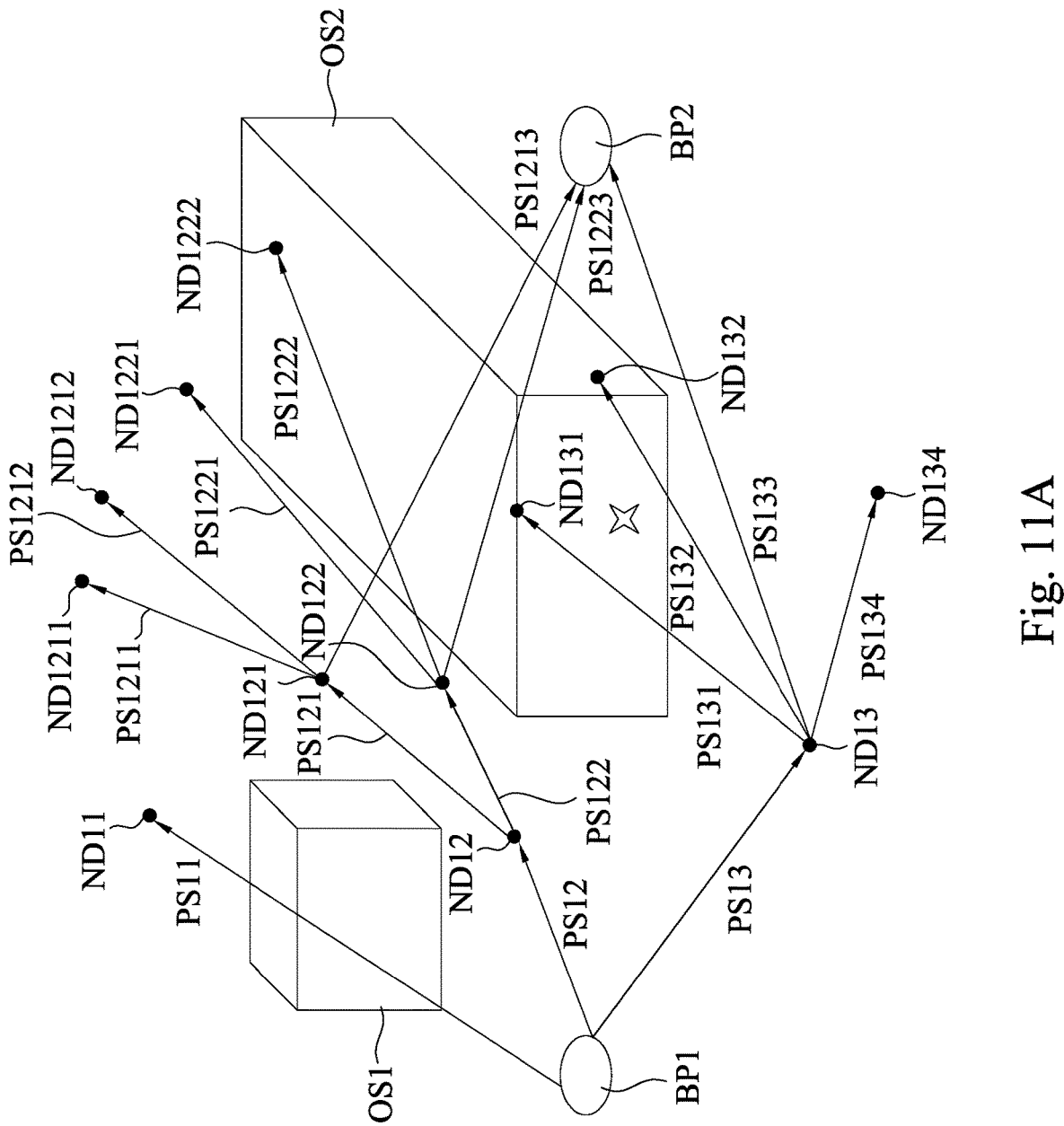
FIG. 11A is a schematic diagram of one of steps of third selection between the positions of the arranged adjacent two of the multiple optimal poses illustrated in some embodiments of the present disclosure.

Reference is made to FIG. 11A together, which is a schematic diagram of one of steps of third selection between the positions of the arranged adjacent two of the multiple optimal poses illustrated in some embodiments of the present disclosure. As shown in FIG. 11A, assuming that the candidate processing segment PS13 is firstly selected in third selection in the first iteration based on the previously calculated selection probability, four candidate processing segments PS131-PS134 and three corresponding candidate nodes ND131-ND132 and ND134 can be generated by a path generation operation. In addition, by the same method as the above-mentioned collision test, it identifies that the end point TP of the processing tool model ST on the manipulator model MAM located on the candidate processing segments PS133-PS134 and the candidate node ND134 will not collide with the simulated obstacles OS1 and OS2 (i.e., the candidate processing segments PS131-PS132 will occur collisions). Next, the selection probability can be calculated based on the above-mentioned same method to select one of the candidate processing segments PS133-PS134.

Figure 11B:
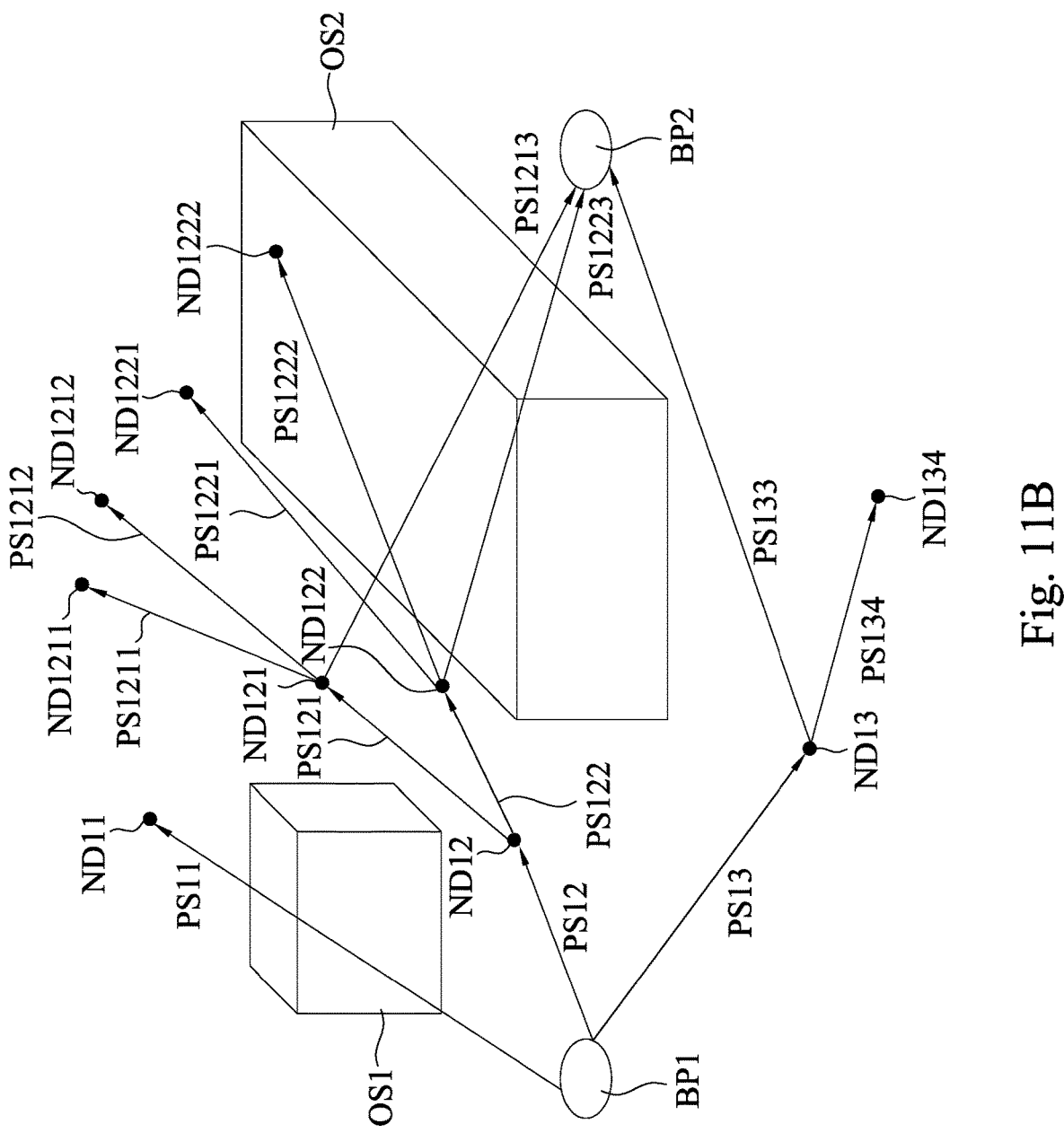
FIG. 11B is a schematic diagram of multiple candidate processing segments generated by the third selection between the positions of the arranged adjacent two of the multiple optimal poses illustrated in some embodiments of the present disclosure.

Reference is made to FIG. 11B together, which is a schematic diagram of multiple candidate processing segments PS11-PS134 generated by the third selection between the positions of the arranged adjacent two of the multiple optimal poses illustrated in some embodiments of the present disclosure. As shown in FIG. 11B, at this time, the candidate processing segments PS133-PS134 can be generated in the third selection. When the candidate processing segment PS133 is selected and the position BP2 is reached, a path of the third selection can include the candidate processing segments PS13 and PS133. Next, after the third selection (i.e., the end of the first iteration), the pheromone concentrations of all the above candidate processing segments can be set as following equation (2).

$$\tau_{ij}(t) = (1-\rho)\tau_{ij}(t-1) + \sum_k \Delta\tau_{ij}^k \qquad \text{equation (2)}$$

where $\tau_{ij}$ is the pheromone concentration on the segment between candidate nodes i and j (at this time, the pheromone concentration of all candidate processing segments is $$\tau_0),$$

t is the t-th iteration, $\rho$ is an evaporation coefficient of the pheromone, and $$\Delta\tau_{ij}^k$$

is a pheromone quantity released by the k-th ant (i.e., k-th path selection) on the segment between candidate nodes i and j, and is set as a product between a reciprocal of a total length of a selected path for the k-th time and the constant Q, where both $\rho$ and Q are preset constants. In addition, if there is no choice to pass segment between candidate nodes i and j for the k-th time, $\tau_{ij}$ will be 0, and no pheromone will be released on it. In other words, the equation (2) can be used for updating the pheromone concentrations of all candidate processing segments at the end of each iteration. Next, in the subsequent 2-4 iterations, paths are also generated and selected in the same way, and the pheromone concentration is updated.

In some embodiments, the processing path planning simulation device 100 can further include a user interface (not shown), and the simulation result can be displayed through the user interface. In some embodiments, the user interface can be implemented by various developing circuits such as a display or a projector.

Figure 12:
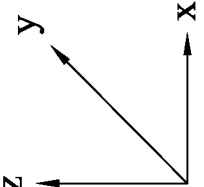
FIG. 12 is a schematic diagram a simulation result illustrated in some embodiments of the present disclosure.

Reference is made to FIG. 12 together, which is a schematic diagram a simulation result illustrated in some embodiments of the present disclosure. As shown in FIG. 12, by using the method in FIGS. 9A-11B, the multiple optimal processing segments BPS1-BPS5 can be generated between the positions BP1-BP4 of the optimal poses. In addition, beside to the positions BP1-BP4 of the optimal poses, nodes ND1-ND2 will also be generated, and the other two processing poses of the mechanical arm model MAM will be generated at the nodes ND1-ND2. In this way, the positions BP1-BP4 and the nodes ND1-ND2 of the optimal poses can be used as multiple optimal nodes, and the multiple optimal processing segments BPS1-BPS5 and the multiple optimal nodes can form an optimal processing path. The optimal processing path not only has the shortest path length but also avoids collisions with the obstacles.

In some embodiments, the optimal processing path is adjusted according to the simulation result, where an adjusted optimal processing path includes multiple adjusted optimal processing segments and multiple adjusted optimal nodes. Next, on the obstacle model OM in the virtual environment SE, based on the adjusted optimal processing path, that the end point TP of the processing tool model ST on the mechanical arm model MAM sequentially with poses corresponding to the multiple adjusted optimal nodes performs the virtual processing operation on the multiple processing point positions PP1-PP4 is simulated, thereby generating an adjusted simulation result.

In some embodiments, by a path pruning algorithm, the optimal node between two optimal processing segments in the optimal processing path is deleted to generate an adjusted optimal processing segment. For example, three adjacent optimal nodes between the multiple optimal processing segments can be randomly selected, and the front and rear optimal nodes of the three adjacent optimal nodes are connected to generate a test processing segment, and the above-mentioned collision test is performed on this test processing segment. If there is no collision, the optimal node in the middle of the three adjacent optimal nodes can be deleted, and this test processing segment can be used as the adjusted optimal processing segment to generate the adjusted optimal processing path. In some embodiments, a smoothing algorithm such as a Bezier curve algorithm or a B-spline algorithm can be used for smoothing the optimal processing path.

In some embodiments, a path file can be generated according to the optimal processing path, where the path file indicates the poses of the mechanical arm model MAM at the multiple optimal nodes. Table (1) below shows an example of the path file.

TABLE 1

| optimal node | x axis | y axis | z axis | RX | RY | RZ |
|---|---|---|---|---|---|---|
| 1 | 0.0725 | 0.0053 | 0.0125 | −1.88E−08 | 0.349066 | 3.141593 |
| 2 | 0.0695 | 0.0058 | 0.0125 | −1.88E−08 | 0.349066 | 3.141593 |
| 3 | 0.0665 | 0.0148 | 0.0215 | −0.03475 | 0.087204 | 2.876831 |
| 4 | 0.063432 | 0.0222 | 0.017 | −9.24E−09 | −0.17453 | 2.617994 |
| 5 | 0.0645 | 0.0108 | 0.0165 | −3.49E−09 | −0.17453 | 2.094395 |
| 6 | 0.0642 | 0.01097 | 0.005 | −3.49E−09 | −0.17453 | 2.094395 |
| 7 | 0.0645 | 0.0008 | 0.0045 | −3.49E−09 | −0.17453 | 2.094395 |
| 8 | 0.0315 | 0.0005 | 0.006 | 1.48E−09 | −0.17453 | 1.570796 |
| 9 | 0.0315 | −0.0022 | 0.0105 | 1.48E−09 | −0.17453 | 1.570796 |
| 10 | 0.0305 | 0.0028 | 0.0225 | 1.51E−05 | −0.14764 | 1.570859 |
| 11 | 0.0225 | 0.0568 | 0.0305 | −1.24E−09 | 0.174533 | 1.570796 |
| 12 | 0.0227 | 0.0569 | 0.021 | −1.24E−09 | 0.174533 | 1.570796 |
| 13 | 0.0135 | 0.0608 | 0.0305 | 2.38E−05 | 0.174571 | 1.832665 |
| 14 | 0.0055 | 0.063698 | 0.0215 | −6.22E−09 | 0.174533 | 2.094395 |
| 15 | 0.0055 | 0.0808 | 0.0215 | −6.22E−09 | 0.174533 | 2.094395 |
| 16 | 0.0755 | 0.0811 | 0.008 | −1.24E−09 | 0.174533 | 1.570796 |
| 17 | 0.0555 | 0.0808 | 0.0255 | 1.50E−05 | 0.174575 | 1.570864 |
| 18 | 0.0645 | 0.0758 | 0.0365 | 2.80E−05 | 0.174614 | 1.570926 |
| 19 | 0.1455 | 0.0328 | 0.0345 | −1.24E−09 | 0.174533 | 1.570796 |
| 20 | 0.1454 | 0.0326 | 0.0243 | −1.24E−09 | 0.174533 | 1.570796 |
| 21 | 0.1455 | 0.0328 | 0.0295 | −1.24E−09 | 0.174533 | 1.570796 |
| 22 | 0.0925 | 0.0218 | 0.0325 | −2.10E−05 | 0.349169 | 1.047343 |
| 23 | 0.0925 | 0.01883 | 0.005 | 6.94E−10 | 0.349066 | 1.047198 |

As shown in the above table (1), the path file can include six-dimensional coordinates of the multiple optimal nodes. In this way, the user can view the path file through the user interface.

In summary, the processing path planning simulation device and method in the present disclosure first input various simulation parameters and models to decide for simulating processing for the optimal pose at the processing point position, and then a simulation processing sequence of these optimal poses is identified, so as to combine the ant colony algorithm and the path generation operation to generate the optimal processing path between the optimal poses. In this way, as long as the required parameters and models are input, the optimal processing path on the physical object to be processed can be simulated automatically. Therefore, it will be able to solve the break time cost and the time cost caused by teaching and programming on site, and further solve the problem that the path planning is not optimal.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A processing path planning simulation device, comprising:

a memory, configured for storing a plurality of instructions; and a processor, connected to the memory, and configured for accessing the plurality of instructions, and performing following operations:

according to an obstacle model in a virtual environment, a plurality of processing point positions on the obstacle model, a mechanical arm model in the virtual environment, a processing tool model on the mechanical arm model, a model position relative relationship and a production strategy parameter, performing collision test simulations to generate a plurality of candidate poses of the mechanical arm model, wherein the plurality of candidate poses are divided into a plurality of pose groups, wherein the plurality of pose groups respectively correspond to the plurality of processing point positions;

performing a path optimization algorithm on the plurality of candidate poses to generate a pose sequence, wherein the pose sequence comprises a plurality of optimal poses arranged in sequence, wherein the pose sequence is generated by selecting one of the candidate poses from each of the pose groups as the optimal pose such that a combination of the plurality of optimal poses of the plurality of pose groups has a shortest path sum comprising a path between any two of the plurality of optimal poses, wherein movement of the mechanical arm model along the path is permitted to cause collision with the obstacle model;

performing an ant colony algorithm based on the plurality of optimal poses of the pose sequence and the obstacle model to generate an optimal processing path, wherein the optimal processing path comprises a plurality of optimal processing segments and a plurality of optimal nodes positioned therebetween, wherein the ant colony algorithm comprises performing a plurality of path generation operations between the plurality of optimal poses to generate the plurality of optimal processing segments, such that movement of the mechanical arm model along the plurality of optimal processing segments is configured to avoid collision with the obstacle model; and on the obstacle model in the virtual environment, based on the optimal processing path, simulating that an end point of the processing tool model on the mechanical arm model sequentially with poses corresponding to the plurality of optimal nodes performs a virtual processing operation on the plurality of processing point positions, thereby generating a simulation result.

2. The processing path planning simulation device of claim 1, wherein the production strategy parameter comprises a collision safety distance, a lateral offset distance, a longitudinal offset distance, a vertical direction distance difference, an inclination angle difference and an azimuth angle difference, wherein the processor is further configured for performing following operations:

for each of the plurality of processing point positions, according to the lateral offset distance, the longitudinal offset distance, the vertical direction distance difference, the inclination angle difference and the azimuth angle difference, generating a plurality of collision test positions of the end point of the processing tool model on the mechanical arm model;

for the each of the plurality of processing point positions, generating a plurality of collision test poses of the mechanical arm model according to the plurality of collision test positions, and selecting a plurality of non-collision poses from the plurality of collision test poses according to the collision safety distance, the plurality of collision test poses and the obstacle model, wherein the mechanical arm model indicates six-dimensional coordinates of a plurality of reference points on the mechanical arm model, wherein the plurality of reference points comprise the end point of the processing tool model on the mechanical arm model; and using the plurality of non-collision poses respectively corresponding to the plurality of processing point positions as the plurality of candidate poses.

3. The processing path planning simulation device of claim 2, wherein the plurality of reference points comprises a plurality of joints of the mechanical arm model, a plurality of mechanical parts of the mechanical arm model connected by the plurality of joints, the processing tool model and the end point of the processing tool model.

4. The processing path planning simulation device of claim 2, wherein the processor is further configured for performing following operations:

generating the plurality of collision test poses according to the plurality of collision test positions;

simulating that the processing tool model performs virtual processing, and determining whether the virtual processing is completed on the plurality of processing point positions;

when the virtual processing is completed, determining whether the processing tool model of the mechanical arm model collides with the obstacle model in one of the plurality of collision test poses; and when no collision occurs with the obstacle model in the one of the plurality of collision test poses, using the one of the plurality of collision test poses as one of the plurality of non-collision poses.

5. The processing path planning simulation device of claim 4, wherein the step of determining whether the processing tool model of the mechanical arm model collides with the obstacle model in the one of the plurality of collision test poses comprises:

determining whether the end point of the processing tool model reaches the one of the plurality of collision test poses by an inverse kinematics method; and when the end point of the processing tool model reaches the one of the plurality of collision test poses, in the one of the plurality of collision test poses, determining whether a plurality of connecting rods between the plurality of reference points in the mechanical arm model and the processing tool model collide with the obstacle model.

6. The processing path planning simulation device of claim 5, wherein the step of, in the one of the plurality of collision test poses, determining whether the plurality of connecting rods between the plurality of reference points in the mechanical arm model and the processing tool model collide with the obstacle model comprise:

determining whether a body structure of the mechanical arm model, the plurality of connecting rods between the plurality of reference points in the mechanical arm model and coordinates of the processing tool model intersect with coordinates of the obstacle model.

7. The processing path planning simulation device of claim 2, wherein the processor is further configured for performing following operations:

according to positions of arranged adjacent two of the plurality of optimal poses, the collision safety distance and a plurality of coordinates corresponding to the obstacle model, performing the plurality of path generation operations to generate a plurality of candidate processing segments and a plurality of candidate nodes, and performing the ant colony algorithm according to an ant quantity parameter and an iterative number to select the plurality of optimal processing segments and the plurality of optimal nodes from the plurality of candidate processing segments and the plurality of candidate nodes.

8. The processing path planning simulation device of claim 1, wherein the processor is further configured for performing following operations:

adjusting the optimal processing path according to the simulation result, wherein an adjusted optimal processing path comprises a plurality of adjusted optimal processing segments and a plurality of adjusted optimal nodes; and on the obstacle model in the virtual environment, based on the adjusted optimal processing path, simulating that the end point of the processing tool model on the mechanical arm model sequentially with poses corresponding to the plurality of adjusted optimal nodes performs the virtual processing operation on the plurality of processing point positions, thereby generating an adjusted simulation result.

9. The processing path planning simulation device of claim 1, wherein the model position relative relationship comprises a relative assembly relationship, which is between the mechanical arm model and the processing tool model, and a pose relative relationship, which is between the obstacle model and the mechanical arm model, in the virtual environment.

10. A processing path planning simulation method, comprising:

according to an obstacle model in a virtual environment, a plurality of processing point positions on the obstacle model, a mechanical arm model in the virtual environment, a processing tool model on the mechanical arm model, a model position relative relationship and a production strategy parameter, performing collision test simulations to generate a plurality of candidate poses of the mechanical arm model, wherein the plurality of candidate poses are divided into a plurality of pose groups, wherein the plurality of pose groups respectively correspond to the plurality of processing point positions;

performing a path optimization algorithm on the plurality of candidate poses to generate a pose sequence, wherein the pose sequence comprises a plurality of optimal poses arranged in sequence, wherein the pose sequence is generated by selecting one of the candidate poses from each of the pose groups as the optimal pose such that a combination of the plurality of optimal poses of the plurality of pose groups has a shortest path sum comprising a path between any two of the plurality of optimal poses, wherein movement of the mechanical arm model along the path is permitted to cause collision with the obstacle model;

performing an ant colony algorithm based on the plurality of optimal poses of the pose sequence and the obstacle model to generate an optimal processing path, wherein the optimal processing path comprises a plurality of optimal processing segments and a plurality of optimal nodes positioned therebetween, wherein the ant colony algorithm comprises performing a plurality of path generation operations between the plurality of optimal poses to generate the plurality of optimal processing segments, such that movement of the mechanical arm model along the plurality of optimal processing segments is configured to avoid collision with the obstacle model; and on the obstacle model in the virtual environment, based on the optimal processing path, simulating that an end point of the processing tool model on the mechanical arm model sequentially with poses corresponding to the plurality of optimal nodes performs a virtual processing operation on the plurality of processing point positions, thereby generating a simulation result.

11. The processing path planning simulation method of claim 10, wherein the production strategy parameter comprises a collision safety distance, a lateral offset distance, a longitudinal offset distance, a vertical direction distance difference, an inclination angle difference and an azimuth angle difference, wherein the step of, according to the obstacle model in the virtual environment, the plurality of processing point positions on the obstacle model, the mechanical arm model in the virtual environment, the processing tool model on the mechanical arm model, the model position relative relationship and the production strategy parameter, performing the collision test simulations to generate the plurality of candidate poses of the mechanical arm model comprises:

for each of the plurality of processing point positions, according to the lateral offset distance, the longitudinal offset distance, the vertical direction distance difference, the inclination angle difference and the azimuth angle difference, generating a plurality of collision test positions of the end point of the processing tool model on the mechanical arm model;

for the each of the plurality of processing point positions, generating a plurality of collision test poses of the mechanical arm model according to the plurality of collision test positions, and selecting a plurality of non-collision poses from the plurality of collision test poses according to the collision safety distance, the plurality of collision test poses and the obstacle model, wherein the mechanical arm model indicates six-dimensional coordinates of a plurality of reference points on the mechanical arm model, wherein the plurality of reference points comprise the end point of the processing tool model on the mechanical arm model; and using the plurality of non-collision poses respectively corresponding to the plurality of processing point positions as the plurality of candidate poses.

12. The processing path planning simulation method of claim 11, wherein the plurality of reference points comprises a plurality of joints of the mechanical arm model, a plurality of mechanical parts of the mechanical arm model connected by the plurality of joints, the processing tool model and the end point of the processing tool model.

13. The processing path planning simulation method of claim 11, wherein the step of, for the each of the plurality of processing point positions, generating the plurality of collision test poses of the mechanical arm model according to the plurality of collision test positions comprises:

generating the plurality of collision test poses according to the plurality of collision test positions, wherein the step of, for the each of the plurality of processing point positions, selecting the plurality of non-collision poses from the plurality of collision test poses according to the collision safety distance, the plurality of collision test poses and the obstacle model comprises:

simulating that the processing tool model performs virtual processing, and determining whether the virtual processing is completed on the plurality of processing point positions;

when the virtual processing is completed, determining whether the processing tool model of the mechanical arm model collides with the obstacle model in one of the plurality of collision test poses; and when no collision occurs with the obstacle model in the one of the plurality of collision test poses, using the one of the plurality of collision test poses as one of the plurality of non-collision poses.

14. The processing path planning simulation method of claim 13, wherein the step of determining whether the processing tool model of the mechanical arm model collides with the obstacle model in the one of the plurality of collision test poses comprises:

determining whether the end point of the processing tool model reaches the one of the plurality of collision test poses by an inverse kinematics method; and when the end point of the processing tool model reaches the one of the plurality of collision test poses, in the one of the plurality of collision test poses, determining whether a plurality of connecting rods between the plurality of reference points in the mechanical arm model and the processing tool model collide with the obstacle model.

15. The processing path planning simulation method of claim 14, wherein the step of, in the one of the plurality of collision test poses, determining whether the plurality of connecting rods between the plurality of reference points in the mechanical arm model and the processing tool model collide with the obstacle model comprise:

determining whether a body structure of the mechanical arm model, the plurality of connecting rods between the plurality of reference points in the mechanical arm model and coordinates of the processing tool model intersect with coordinates of the obstacle model.

16. The processing path planning simulation method of claim 11, wherein the step of performing the ant colony algorithm based on the pose sequence and the obstacle model to generate the optimal processing path comprises:

according to positions of arranged adjacent two of the plurality of optimal poses, the collision safety distance and a plurality of coordinates corresponding to the obstacle model, performing the plurality of path generation operations to generate a plurality of candidate processing segments and a plurality of candidate nodes, and performing the ant colony algorithm according to an ant quantity parameter and an iterative number to select the plurality of optimal processing segments and the plurality of optimal nodes from the plurality of candidate processing segments and the plurality of candidate nodes.

17. The processing path planning simulation method of claim 10, further comprising:

adjusting the optimal processing path according to the simulation result, wherein an adjusted optimal processing path comprises a plurality of adjusted optimal processing segments and a plurality of adjusted optimal nodes; and on the obstacle model in the virtual environment, based on the adjusted optimal processing path, simulating that the end point of the processing tool model on the mechanical arm model sequentially with poses corresponding to the plurality of adjusted optimal nodes performs the virtual processing operation on the plurality of processing point positions, thereby generating an adjusted simulation result.

18. The processing path planning simulation method of claim 10, wherein the model position relative relationship comprises a relative assembly relationship, which is between the mechanical arm model and the processing tool model, and a pose relative relationship, which is between the obstacle model and the mechanical arm model, in the virtual environment.

* * * * *